(12) United States Patent
Sangu et al.

(10) Patent No.: US 11,334,153 B2
(45) Date of Patent: May 17, 2022

(54) OPTICAL DEVICE, RETINAL PROJECTION DISPLAY, HEAD-MOUNTED DISPLAY, AND INPUT DEVICE

(71) Applicants: Suguru Sangu, Kanagawa (JP); Tatsuya Shimokawa, Osaka (JP); Shu Tanaka, Osaka (JP); Shuichi Suzuki, Kanagawa (JP)

(72) Inventors: Suguru Sangu, Kanagawa (JP); Tatsuya Shimokawa, Osaka (JP); Shu Tanaka, Osaka (JP); Shuichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/689,334

(22) Filed: Nov. 20, 2019

(65) Prior Publication Data

US 2020/0174564 A1 Jun. 4, 2020

(30) Foreign Application Priority Data

Nov. 29, 2018 (JP) .............................. JP2018-223811

(51) Int. Cl.
*G06F 3/01* (2006.01)
(52) U.S. Cl.
CPC .................................... *G06F 3/013* (2013.01)
(58) Field of Classification Search
None
See application file for complete search history.

(56) References Cited

U.S. PATENT DOCUMENTS

| 2007/0159599 A1 | 7/2007 | Kamada | |
|---|---|---|---|
| 2009/0103577 A1* | 4/2009 | Maeno | G02B 26/101 372/24 |
| 2016/0166146 A1 | 6/2016 | Sarkar | |
| 2017/0131766 A1 | 5/2017 | He et al. | |
| 2017/0276934 A1 | 9/2017 | Sarkar | |
| 2019/0286228 A1 | 9/2019 | Sangu | |
| 2020/0285058 A1 | 9/2020 | Sangu et al. | |

FOREIGN PATENT DOCUMENTS

| JP | 2008-281493 | 11/2008 |
|---|---|---|
| JP | 2009-183325 | 8/2009 |
| JP | 2019-154815 | 9/2019 |
| JP | 2020-081449 | 6/2020 |
| JP | 2021-005072 | 1/2021 |
| WO | 2006/019028 | 2/2006 |

OTHER PUBLICATIONS

Extended European Search Report for 19210728.2 dated Apr. 9, 2020.
"Optical Mechanism of Eye", Precision Engineering 27-11, 1961, pp. 750-755 (Partial Translation).
U.S. Appl. No. 16/292,435, filed Mar. 5, 2019.

* cited by examiner

*Primary Examiner* — Nicholas J Lee
(74) *Attorney, Agent, or Firm* — IPUSA, PLLC

(57) ABSTRACT

An optical device includes a light source that emits light to irradiate an object, a light emission driver that drives the light source to emit light at a predetermined light emission period, a position detector that outputs a detection signal corresponding to reflected light that is the light reflected by the object, and a signal extractor that extracts, from the detection signal, a signal with a period corresponding to the light emission period by using a reference signal with a period corresponding to the light emission period, and outputs the extracted signal.

19 Claims, 16 Drawing Sheets

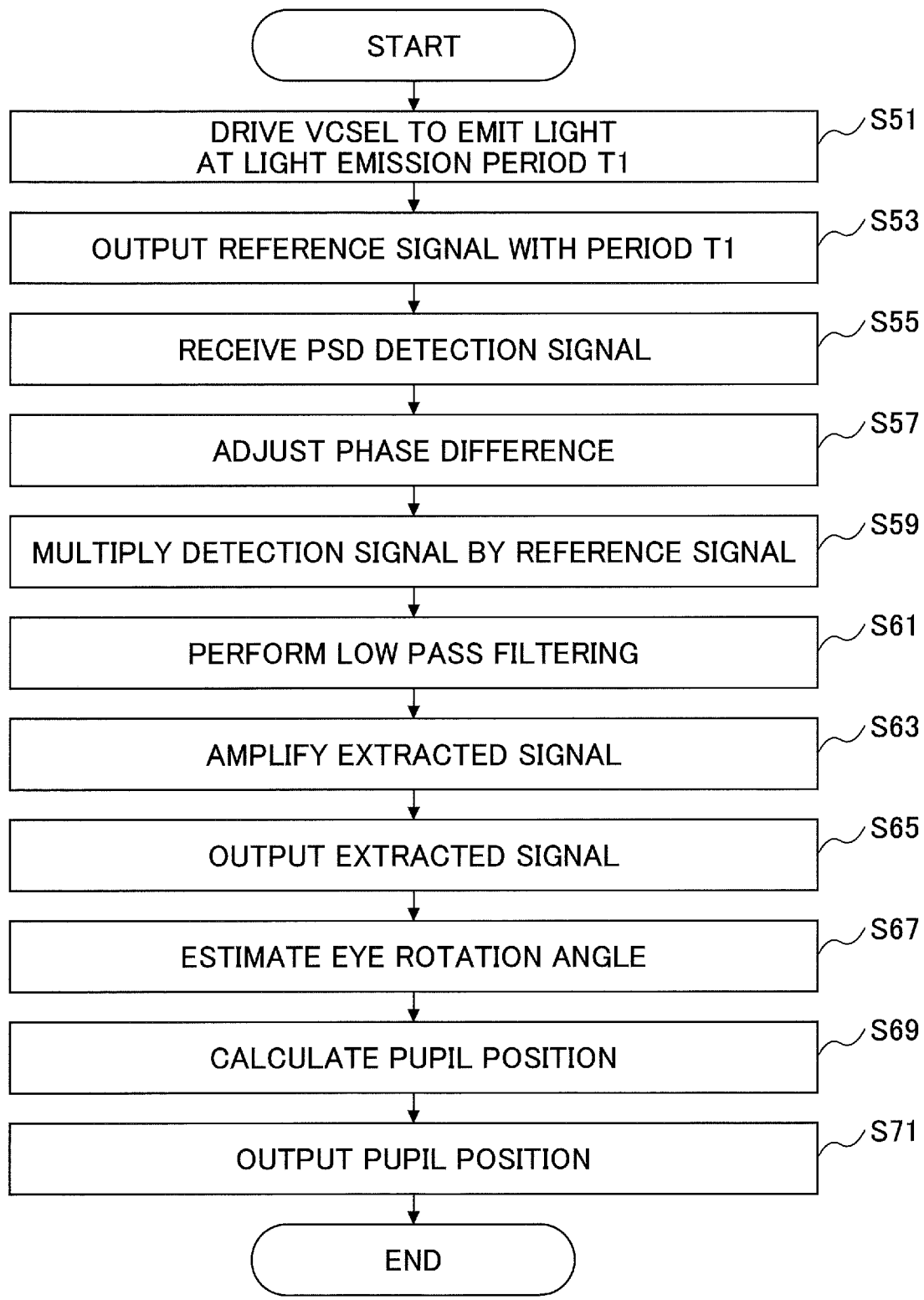

OPTICAL DEVICE, RETINAL PROJECTION DISPLAY, HEAD-MOUNTED DISPLAY, AND INPUT DEVICE

CROSS-REFERENCE TO RELATED APPLICATION

The present application claims priority under 35 U.S.C. § 119 to Japanese Patent Application No. 2018-223811, filed on Nov. 29, 2018. The contents of which are incorporated herein by reference in their entirety.

BACKGROUND OF THE INVENTION

1. Field of the Invention

An aspect of this disclosure relates to an optical device, a retinal projection display, a head-mounted display, and an input device.

2. Description of the Related Art

In recent years, technologies and products related to virtual reality (VR) and augmented reality (AR) have been attracting attention. Particularly, AR technologies are expected to be applied to industrial fields to display digital information in real space. Because people using AR technologies obtain most of cognitive information visually, eyeglass display devices usable in behavioral (working) environments have been developed.

An example of such an eyeglass display device is a retinal projection display that employs a retinal drawing technique in which a laser is used to draw an image directly on the retina of a human. The retinal drawing method makes it possible to superimpose a focus-free image on visual information. This in turn makes it possible to display digital information on the retina with the visual point placed on the outside and to enable a person to recognize the digital information.

When a retinal projection display with a laser is used in a behavioral (working) environment that involves ocular movements, the laser beam may be eclipsed in, for example, the periphery of the cornea or the pupil due to the limitation in the size of the cornea or the pupil, and a desired image may not be drawn in a desired position.

In view of the above problem, an eye-tracking technology has been proposed (see, for example, US Patent Application Publication No. 2016/0166146 and US Patent Application Publication No. 2017/0276934). In the eye-tracking technology, a laser beam is scanned on the eye using a MEMS (Micro Electro Mechanical Systems) mirror, and the position of the cornea of the eye is detected based on a detection signal indicating the detection of reflected light from the eye.

With the technology disclosed in the US Patent Application Publications described above, to accurately detect the position of the cornea of the eye, it is necessary to detect reflected light from the eye by separating the reflected light from ambient light such as sunlight or interior illumination. This in turn makes it necessary to increase the intensity of the laser beam. However, increasing the intensity of the laser beam reduces the safety of the eye. Therefore, it is difficult to improve the detection accuracy using the technology disclosed in the US Patent Application Publications.

SUMMARY OF THE INVENTION

According to one aspect of the present invention, there is provided an optical device including a light source that emits light to irradiate an object; a light emission driver that drives the light source to emit light at a predetermined light emission period; a position detector that outputs a detection signal corresponding to reflected light that is the light reflected by the object; and a signal extractor that extracts, from the detection signal, a signal with a period corresponding to the light emission period by using a reference signal with a period corresponding to the light emission period, and outputs the extracted signal.

BRIEF DESCRIPTION OF THE DRAWINGS

FIG. 5 is a flowchart illustrating a process performed by the processor module according to the first embodiment;

DESCRIPTION OF THE EMBODIMENTS

In view of the above-described problem of the related-art technology, an aspect of this disclosure makes it possible to accurately detect an object using light with a low intensity.

Embodiments of the present invention are described below with reference to the accompanying drawings. The same reference number is assigned to the same component throughout the drawings, and repeated descriptions of the same component are omitted.

In a first embodiment and a second embodiment, a pupil position detecting device is described as an example of an optical device. In a third embodiment, a surface shape measuring device is described as an example of an optical device. In the examples described in these embodiments, each of the pupil position detecting device and the surface shape measuring device is attached to an eyeglass-type support.

In a fourth embodiment, an example of a retinal projection display is described.

In each embodiment, the right eye (or eyeball) of a human is used to describe the embodiment. However, the descriptions may also be applied to the left eye (or eyeball) of a human. Also, two optical devices or two retinal projection displays may be provided for the right and left eyes (eyeballs), respectively.

<Configuration of Pupil Position Detecting Device>

Figure 1:
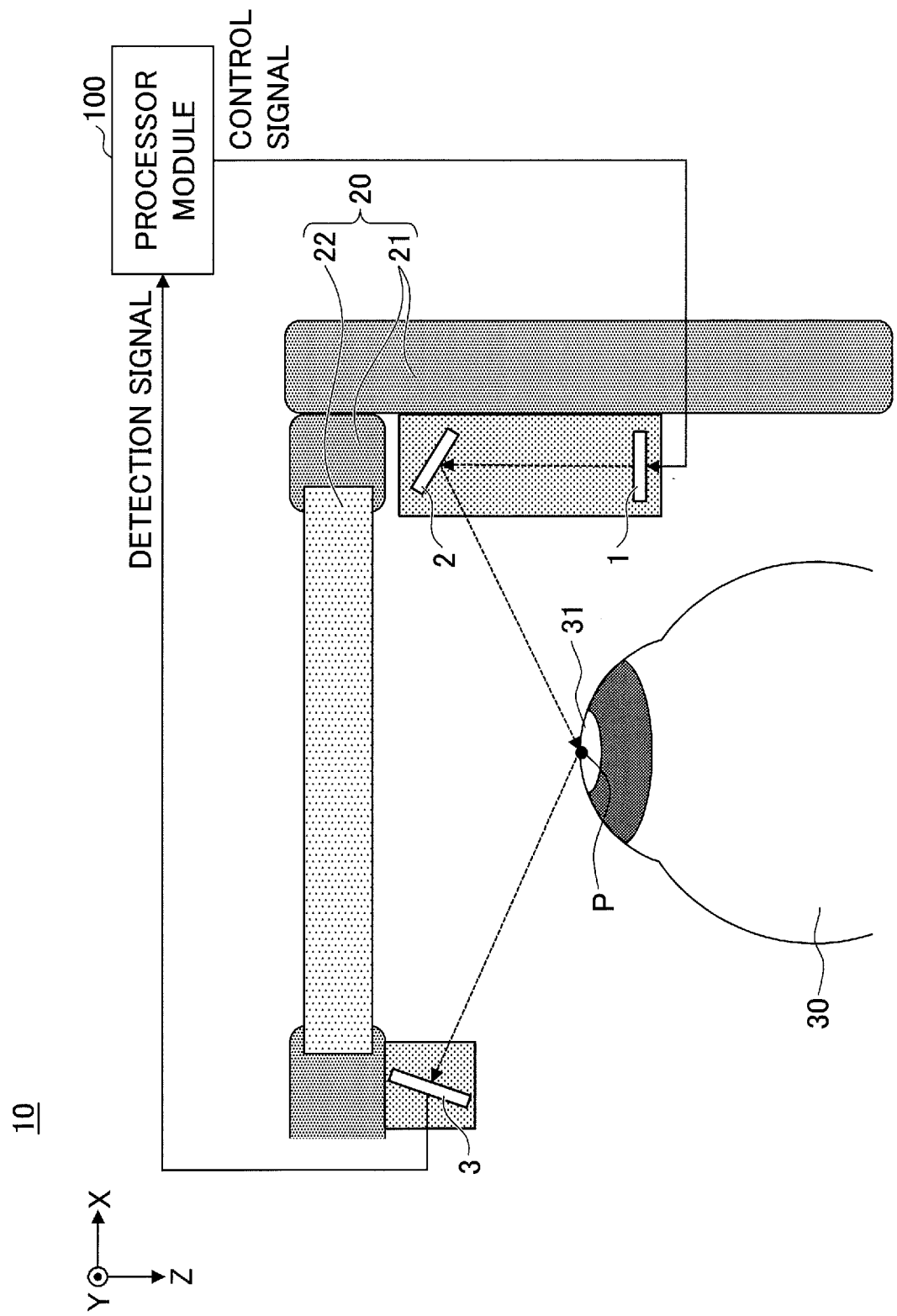
FIG. 1 is a drawing illustrating a configuration of a pupil position detecting device according to an embodiment.

FIG. 1 is a drawing illustrating a configuration of a pupil position detecting device 10 according to an embodiment.

As illustrated in FIG. 1, the pupil position detecting device 10 includes a vertical cavity surface emitting laser (VCSEL) 1, which is an example of a light source, a planar mirror 2, a position sensitive detector (PSD) 3, and a processor module 100. The VCSEL 1, the planar mirror 2, and the PSD 3 are mounted on an eyeglass frame 21 of an eyeglass-type support 20 including the eyeglass frame 21 and an eyeglass lens 22. The processor module 100 may be disposed in any position. In this example, the processor module 100 is disposed on the eyeglass frame 21. Here, the PSD 3 is an example of a position detector.

The VCSEL 1 includes multiple light emitters arranged two-dimensionally in a plane. The VCSEL 1 can cause laser beams emitted from the light emitters to be incident on multiple positions on an eye (eyeball) 30, or cause the laser beams to be incident on the eye 30 at multiple angles. Here, "multiple light emitters" are synonymous with "multiple light emitting points" and "multiple light emitting elements". Each light emitter emits a directional laser beam upward in FIG. 1. Here, the VCSEL 1 is an example of a light source or a surface emitting laser. Also, a laser beam is an example of light.

The light source is not limited to a VCSEL and may be any device that can illuminate the eye 30. The light source may be formed by arranging multiple laser diodes (LD) or light emitting diodes (LED) two-dimensionally in a plane. Also, the light source may be a pulsed laser that emits pulsed laser beams. Further, the light source may be formed by combining multiple types of light sources depending on a detection target.

The wavelength of the laser beam emitted by the VCSEL 1 is preferably a wavelength of near-infrared light, which is invisible light, so as not to interfere with the vision of the person whose pupil position is to be detected. However, the laser beam is not limited to invisible light but may be visible light.

A laser beam emitted from the VCSEL 1 is reflected by the planar mirror 2 toward the eye 30 and enters the eye 30 at a position near a pupil 31. The incident angle of the laser beam on the eye 30 is adjusted such that the laser beam is incident on the center of the pupil 31 of the eye 30 at a predetermined angle while the eye 30 is looking straight ahead.

The pupil surface (corneal surface) of the eye 30 is a transparent body containing water and typically has a reflectance of about 2-4%. Therefore, the laser beam entering the eye 30 at a position near the pupil 31 is reflected by the pupil surface of the eye 30 at a reflection point P, and the reflected light beam enters the light receiving surface of the PSD 3 to form a beam spot. For simplicity, the light beam reflected by the eye 30 is hereafter referred to as "signal light".

The PSD 3 is a two-dimensional light position detecting device that detects a current value corresponding to a distance between incident light and an electrode in each of two directions that are orthogonal to each other in the light receiving surface, and outputs a detection signal indicating a position of the incident light based on a ratio between the current values in the two orthogonal directions. The PSD 3 can output a detection signal indicating the position of a beam spot formed by the signal light on the light receiving surface of PSD 3.

More specifically, the PSD 3 includes four output terminals, a resistive film provided on a continuous light receiving surface (which is not divided into pixels), and a pair of electrodes extending in two orthogonal directions. A photocurrent generated at the position of a beam spot is divided into four depending on the distances between the position of the beam spot and the output terminals. Here, due to the electrical resistance of the resistive film, the electric current decreases as the distance between the position of the beam spot and the output terminal increases. The PSD 3 can detect electric signals passing through the resistive film via the four output terminals and output a detection signal that indicates a position in the light receiving surface and is obtained by performing electrical post-processing on the electric signals. Also, the PSD 3 can convert an electric current generated by photoelectric conversion into an analog voltage signal and output the analog voltage signal as a detection signal from each of the four output terminals. Thus, the PSD 3 can detect an incident position based on distances from the output terminals that are obtained based on the surface resistance.

When an image sensor (imaging device) is used as the light position detecting device instead of the PSD 3, the output of the image sensor depends on the luminance of light entering each pixel. The output current from the image sensor decreases as the luminance of incident light decreases. Therefore, to prevent the influence of ambient light such as sunlight, it is necessary to increase the luminance of light entering the image sensor by increasing the output power of the light source. However, when the light source is used to emit light that enters the eye 30, increasing the output power of the light source is not preferable in terms of safety of the eye 30.

Also, when an image sensor is used, image processing is necessary to detect the position of incident light. This may reduce the accuracy of the detected position and increase the processing load. On the other hand, with the PSD 3, the position of incident light is detected based on the ratios (percentages) of electric currents divided among the output terminals. Therefore, the PSD 3 can detect the position of incident light regardless of the luminance of the incident light without performing image processing. Further, according to an embodiment, an extracted signal with a period corresponding to the light emission period is extracted from a detection signal by using a reference signal with a period corresponding to the light emission period. This configuration makes it possible to more accurately detect the position of incident light.

The above-described configuration of the PSD 3 is just an example, and the PSD 3 may have any other configuration. Also, although a two-dimensional PSD for detecting a two-dimensional position in the light receiving surface is used as the PSD 3 in the present embodiment, a one-dimensional PSD for detecting a one-dimensional position in the light receiving surface may instead be used.

The position of a beam spot formed by signal light on the light receiving surface of the PSD 3 changes depending on the inclination of the eye 30. Accordingly, the pupil position detecting device 10 can detect the pupil position of the eye 30 by converting the detection signal from the PSD 3 into coordinate information.

Here, the PSD 3 detects the orientation of a normal vector at the reflection point on the eye 30, i.e. detects the three-dimensional shape of the eye 30. The pupil position detecting device 10 can estimate the pupil position based on the correspondence between the detected three-dimensional shape and the surface shape model of the eye 30.

The laser beam emitted by the VCSEL 1 is not necessarily caused to enter the eye 30 by the planar mirror 2. For example, the laser beam from the VCSEL 1 may be caused to directly enter the eye 30, or may be caused to enter the eye 30 by one or more components.

For example, using one or more of a convex lens, a micro-lens array, a concave curved mirror, a hologram diffraction element, a prism array, and a diffraction grating to deflect the laser beam emitted by the VCSEL 1 to enter the eye 30 makes it possible to increase a pupil detection range, reduce the size of the pupil position detecting device 10, and reduce the assembly load of the pupil position detecting device 10.

In FIG. 1, an eyeglass frame is used as a structure for supporting an optical system and a processor module. However, the present invention is not limited to this embodiment. For example, any other type of support structure such as a head-mounted display or a headgear may also be used.

Here, the eye 30 makes ocular movements such as rotation. When the direction of the signal light changes due to an ocular movement, the signal light may fail to enter the light receiving surface of the PSD 3. The pupil position detecting device 10 is configured to sequentially or selectively change light emitters of the VCSEL 1 to be caused to emit light and thereby prevent the signal light from failing to enter the light receiving surface of the PSD 3.

Figure 2A:
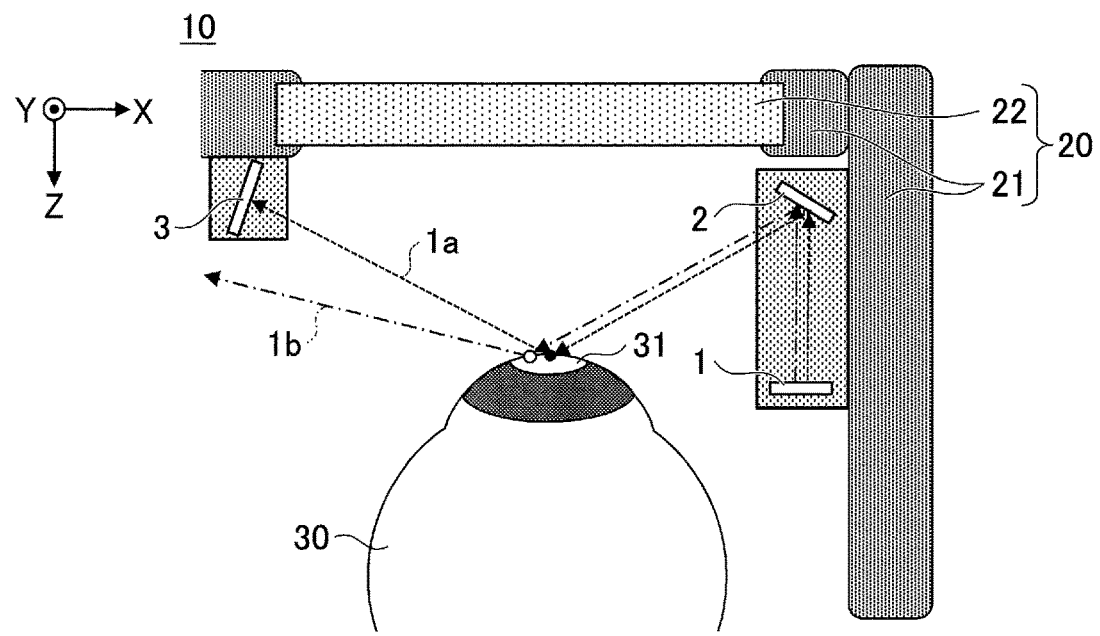
FIGS. 2A and 2B are drawings illustrating a relationship between a rotation of an eye and an incident position of signal light on a PSD.
Figure 2B:
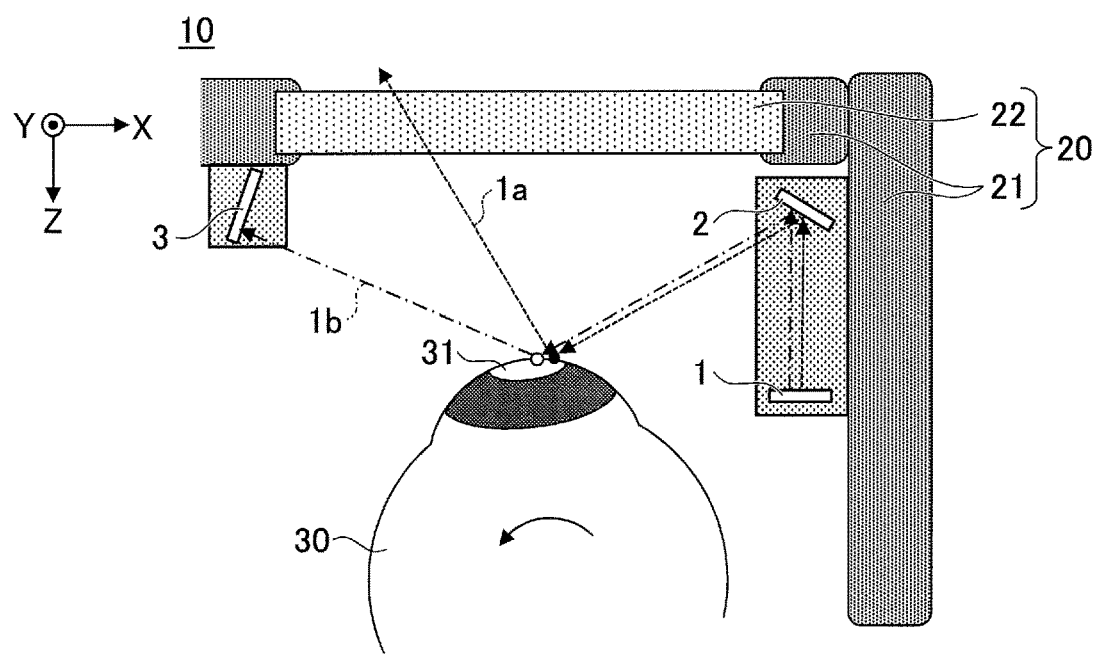

FIGS. 2A and 2B are drawings illustrating a relationship between a rotation of the eye 30 and an incident position of signal light on the PSD 3. FIG. 2A is a drawing illustrating a case in which the eye 30 is not rotated (when the eye is looking straight ahead), and FIG. 2B is a drawing illustrating a case in which the eye 30 is rotated.

In each of FIGS. 2A and 2B, it is assumed that laser beams are emitted from two different light emitters of the VCSEL 1. A laser beam 1a emitted from one of the light emitters is indicated by a dotted line, and a laser beam 1b emitted from another one of the light emitters is indicated by a dashed-dotted line.

In FIG. 2A, the laser beam 1a is reflected by the eye 30 and enters the PSD 3 at a position near the center of the light receiving surface. Accordingly, the PSD 3 can detect the change in the incident position of the laser beam 1a on the light receiving surface according to the rotation of the eye 30, and the pupil position detecting device 10 can detect the position of the pupil 31 based on a detection signal of the PSD 3.

On the other hand, the laser beam 1b does not enter the light receiving surface of the PSD 3 after being reflected by the eye 30. Accordingly, the PSD 3 cannot detect the position of the laser beam 1b, and the pupil position detecting device 10 cannot detect the position of the pupil 31.

When the eye 30 rotates greatly as illustrated in FIG. 2B, the laser beam 1a does not enter the light receiving surface of the PSD 3, and the pupil position detecting device 10 cannot detect the position of the pupil 31. On the other hand, the laser beam 1b enters the PSD 3 at a position near the center of the light receiving surface. Accordingly, the PSD 3 can detect a change in the incident position of the laser beam 1b on the light receiving surface according to the rotation of the eye 30, and the pupil position detecting device 10 can detect the position of the pupil 31 based on the detection signal of the PSD 3.

Thus, when light from only one light emitter is used, the pupil position of the eye 30 can be detected only in a limited angle range. According to the present embodiment, light emitters of the VCSEL 1 to be used to emit light are changed to change the incidence angle of the light on the eye 30. This configuration makes it possible to increase the detection range of the pupil position.

Light emitters of the VCSEL 1 are changed sequentially in time according to an ocular movement of the eye 30 based on a driving signal from the processor module 100. Controlling the light emitters according to (or following) ocular movements of the eye 30 makes it possible to improve the light utilization efficiency and reduce estimation time.

However, the light emitters are not necessary controlled according to ocular movements. For example, the pupil position detecting device 10 may be configured to cause the light emitters of the VCSEL 1 to emit light by raster scanning (or sequentially) at a predetermined time interval independent of ocular movements, and to obtain a coarse position of the eye 30 based on a detection signal of the PSD 3 at the predetermined time interval.

Although only laser beams emitted from two light emitters are illustrated in FIG. 2 for simplicity, more light emitters of the VCSEL 1 may be used depending on the type of ocular movement of the eye 30. Also, the number and the positions of the light emitters of the VCSEL 1 may be adjusted in accordance with the size of the light receiving surface of the PSD 3 and the size of the eye so that the position of the pupil 31 can be properly detected.

<Configuration of Processor Module>

Figure 3:
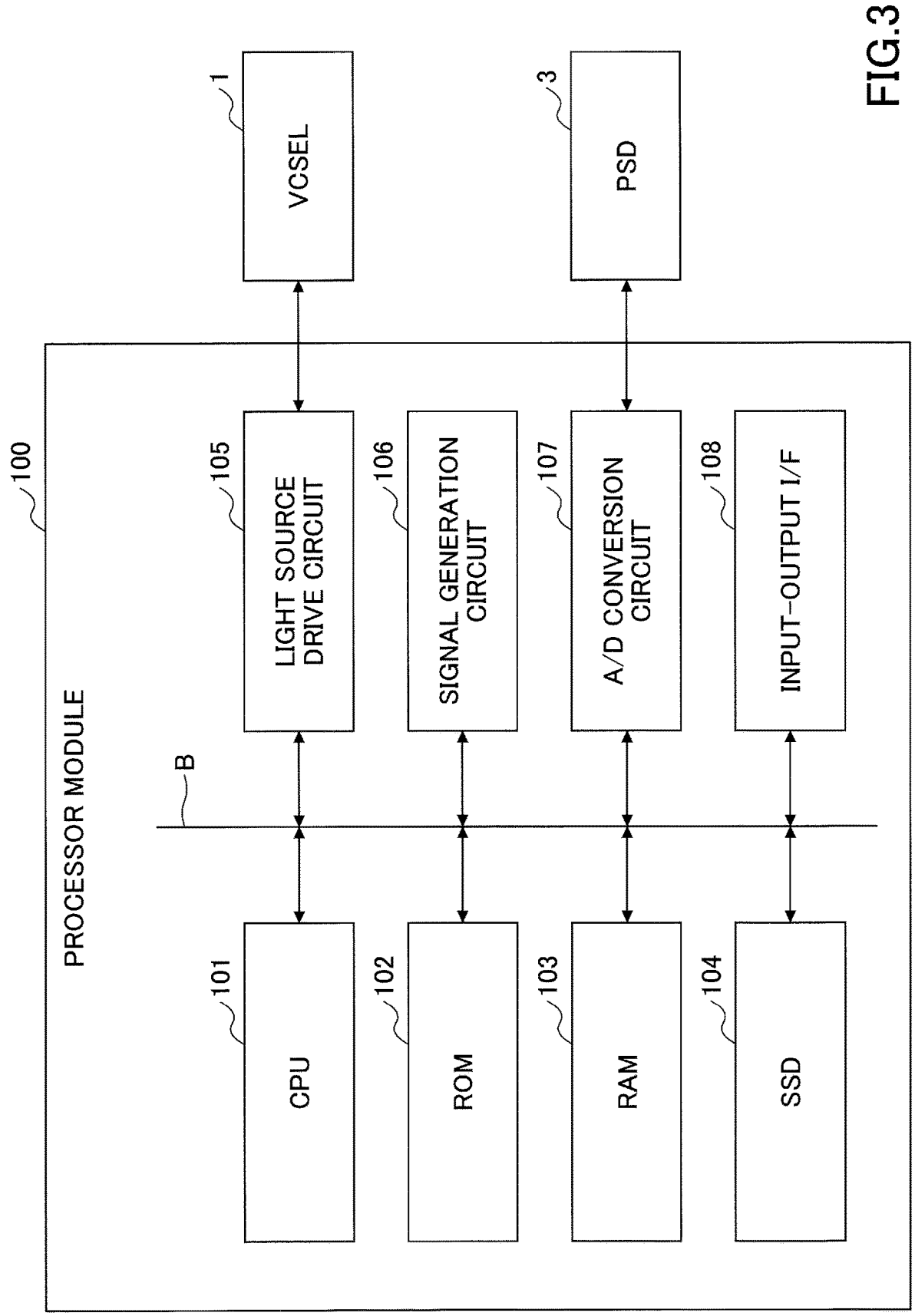
FIG. 3 is a block diagram illustrating a hardware configuration of a processor module according to an embodiment.

Next, a hardware configuration of the processor module 100 according to an embodiment is described. FIG. 3 is a block diagram illustrating an example of a hardware configuration of the processor module 100.

The processor module 100 includes a central processing unit (CPU) 101, a read-only memory (ROM) 102, a random access memory (RAM) 103, a solid state drive (SSD) 104, a light source drive circuit 105, a signal generation circuit 106, an analog/digital (A/D) conversion circuit 107, and an input-output interface (I/F) 108. These components are connected to each other via a system bus B.

The CPU 101 is an arithmetic unit that reads programs and data from a storage device such as the ROM 102 or the SSD 104, loads the programs and data into the RAM 103, and executes processes to control the entire processor module 100 and implement functions described later. Some or all of the functions of the CPU 101 may be implemented by hardware such as an application specific integrated circuit (ASIC) or a field-programmable gate array (FPGA).

The ROM 102 is a non-volatile semiconductor memory (storage device) capable of retaining programs and data even when the power is turned off. The ROM 102 stores programs and data such as a BIOS (Basic Input/Output System) that is executed when the processor module 100 is started, OS settings, and network settings. The RAM 103 is a volatile semiconductor memory (storage device) for temporarily storing programs and data.

The SSD 104 is a non-volatile memory that stores programs and various types of data used by the processor module 100 to execute processes. The SSD 104 may be replaced with a hard disk drive (HDD).

The light source drive circuit 105 is an electric circuit that is electrically connected to the VCSEL 1 and outputs a driving signal, such as a drive voltage, to the VCSEL 1 according to an input control signal. The light source drive circuit 105 can drive multiple light emitters of the VCSEL 1 to emit light simultaneously or sequentially, and can drive light emitters to emit light at different light emission periods by modulating the period of the drive voltage.

The drive voltage may have a voltage waveform such as a square wave, a sinusoidal wave, or any other predetermined wave. The light source drive circuit 105 can modulate the period of a drive voltage signal by changing the period (frequency) of such a voltage waveform.

The signal generation circuit 106 is an electric circuit that generates an electric signal with a predetermined period. The signal generation circuit 106 may be implemented by a multi-channel signal generator that can generate multiple electric signals with different periods and output the electric signals concurrently to multiple destinations.

The A/D conversion circuit 107 is electrically connected to the PSD 3, converts an analog voltage signal output from the PSD 3 into a digital voltage signal, and outputs the digital voltage signal.

The input-output I/F 108 is an interface for connecting the processor module 100 to an external apparatus such as a personal computer (PC) or a video device.

First Embodiment

<Functional Configuration of Processor Module of First Embodiment>

Figure 4:
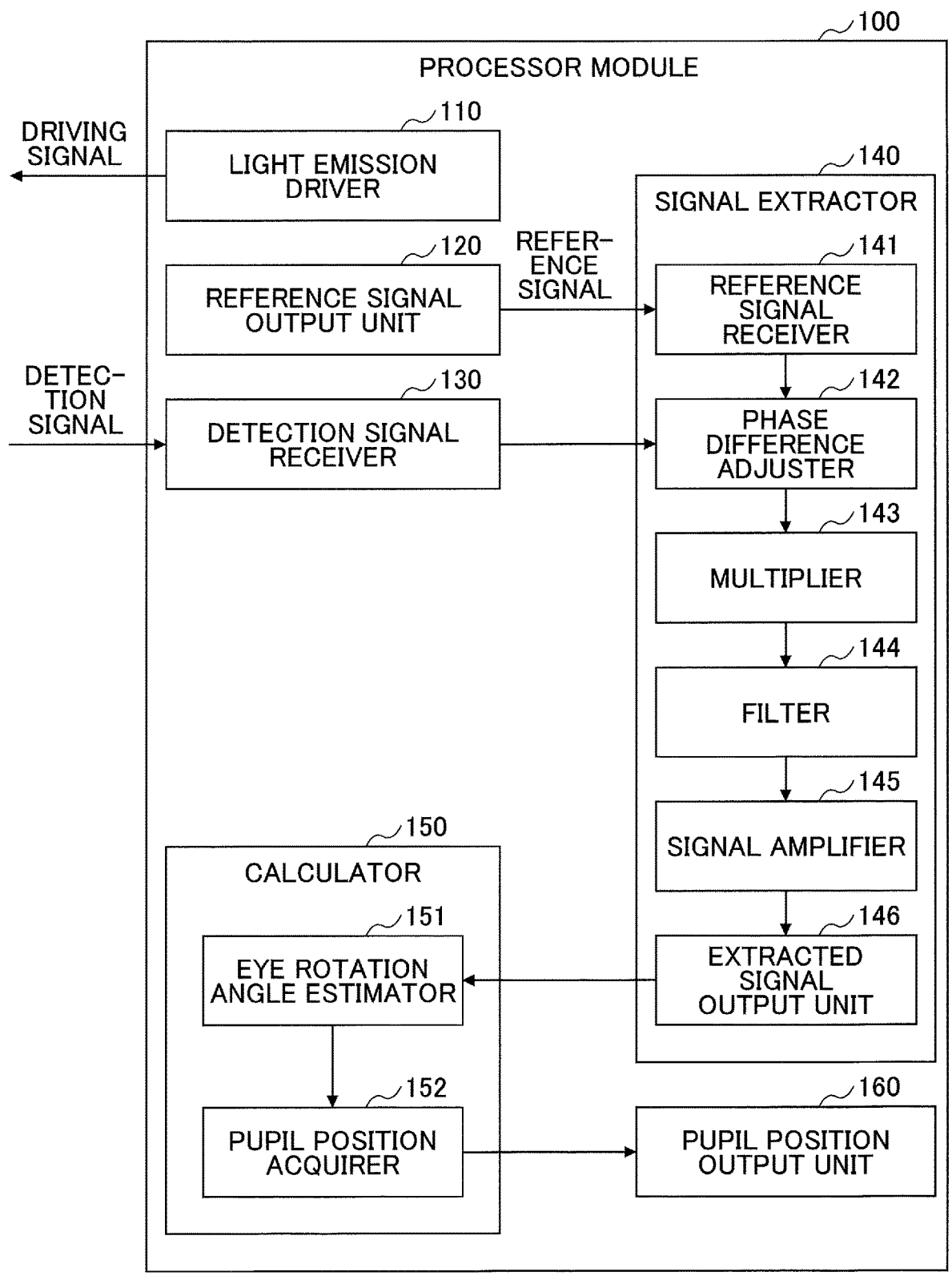
FIG. 4 is a block diagram illustrating a functional configuration of a processor module according to a first embodiment.

Next, a functional configuration of the processor module 100 according to a first embodiment is described. FIG. 4 is a block diagram illustrating an example of a functional configuration of the processor module 100. The functional blocks illustrated in FIG. 4 indicate a conceptual configuration of the processor module 100 and do not necessary indicate a physical configuration or arrangement of components of the processor module 100. All or a part of the functional blocks may be separated or combined functionally or physically in any appropriate unit. The function of each functional block may be implemented by executing a program by the CPU 101 unless otherwise mentioned.

As illustrated in FIG. 4, the processor module 100 includes a light emission driver 110, a reference signal output unit 120, a detection signal receiver 130, a signal extractor 140, a calculator 150, and a pupil position output unit 160. Here, the pupil position output unit 160 is an example of an "output unit".

The light emission driver 110 outputs a driving signal with a period T1 to the VCSEL 1 and includes a function to drive light emitters of the VCSEL 1 to emit light at a light emission period T1. The light emission driver 110 may be implemented by, for example, the light source drive circuit 105. The period T1 is an example of a "predetermined period".

The reference signal output unit 120 may be implemented by, for example, the signal generation circuit 106. The reference signal output unit 120 includes a function to output a reference signal with a period TR to a reference signal receiver 141 of the signal extractor 140. The signal generation circuit 106 may have a function to output a signal with the period T1 to the light emission driver 110 in addition to the function to output the reference signal with the period TR. The light emission driver 110 may be configured to output a driving signal with the period T1 to the VCSEL 1 in response to the signal received from the signal generation circuit 106. In this case, the signal generation circuit 106 is an example of a "signal generator".

The detection signal receiver 130 may be implemented by, for example, the A/D conversion circuit 107, and includes a function to output a digital voltage signal, which is obtained by A/D converting an analog voltage signal received from the PSD 3, to a phase difference adjuster 142 of the signal extractor 140.

Here, because the eye 30 is irradiated by the VCSEL 1 with a laser beam having the light emission period T1, the detection signal indicating the detection of signal light by the PSD 3 is an electric signal with the period T1. However, depending on the environment where the pupil position detecting device 10 is used, ambient light (which is hereafter referred to as noise light) such as sunlight or interior illumination may exist. In such a case, the detection signal output from the PSD 3 may include an electric signal corresponding to signal light with the period T1 and an electric signal corresponding to noise light.

The signal extractor 140 includes a function to extract an electric signal with a period corresponding to the light emission period from the detection signal output from the PSD 3 by using a reference signal with a period corresponding to the light emission period of the light emitters of the VCSEL 1. To achieve this function, the signal extractor 140 includes the reference signal receiver 141, the phase difference adjuster 142, a multiplier 143, a filter 144, a signal amplifier 145, and an extracted signal output unit 146. Here, "the period corresponding to the light emission period" is, for example, a period that is the same as the light emission period, or a period that is a multiple or a divisor of the light emission period.

The reference signal receiver 141 receives a reference signal from the reference signal output unit 120 and outputs the reference signal to the phase difference adjuster 142.

The phase difference adjuster 142 receives a detection signal via the detection signal receiver 130 from the PSD 3 and receives a reference signal via the reference signal receiver 141 from the reference signal output unit 120. The phase difference adjuster 142 includes a function to adjust a phase difference between a phase φR of the reference signal and a phase φ1 of the detection signal and output the reference signal and the detection signal to the multiplier 143. This adjustment makes it possible to maximize the output of a direct-current signal after low-pass filtering described later.

The multiplier 143 multiplies the detection signal and the reference signal received from the phase difference adjuster 142.

Here, a detection signal Sd(t) output from the PSD 3 is expressed by formula (1) below, and a reference signal R(t) is expressed by formula (2) below.

$$Sd(t)=Nb(t)+S(t)\times\sin(2\pi \cdot t/T1+\varphi 1) \quad (1)$$

$$R(t)=A\times\sin(2\pi \cdot t/TR+\varphi R) \quad (2)$$

In formulas (1) and (2), t represents a time, Nb represents a noise light component in the detection signal, φ1 represents the phase of a signal light component in the detection signal, A represents the amplitude of the reference signal, and φR represents the phase of the reference signal.

A signal obtained by multiplying the detection signal and the reference signal by the multiplier 143 is represented by formula (3) below.

$$Sd(t) \times R(t) = A \times Nb(t) \times \sin(2\pi \cdot t/TR + \phi R) + A \times S(t) \times \{\cos[(1/T1 - 1/TR) \times t + (\phi 1 - \phi R)] + \cos[(1/T1 + 1/TR) \times t + (\phi 1 + \phi R)]\} \quad (3)$$

As indicated by formula (3), as a result of making the period T1 substantially match the period TR by the phase difference adjuster 142, a difference frequency component in the detection signal between the signal light component and the reference signal becomes a direct-current signal. This makes it possible to separate the signal light component S(t) and the noise light component Nb(t) from each other in the frequency domain. Here, "substantially match" indicates that a difference that is generally recognized as an error is tolerable. This also applies to the descriptions below.

The multiplier 143 outputs a multiplied signal obtained by multiplying the detection signal by the reference signal to the filter 144.

The filter 144 includes a function to perform low-pass filtering on the multiplied signal and output an extracted signal corresponding to at least one of an extracted direct-current component and an extracted low-frequency component to the signal amplifier 145. The signal amplifier 145 amplifies the extracted signal to such a level that the extracted signal can be processed for calculation of the pupil position and outputs the amplified extracted signal to the extracted signal output unit 146. The extracted signal output unit 146 outputs the amplified extracted signal to the calculator 150.

To synchronize the phases, the phase difference adjuster 142 may use a method where the maximum value of a direct-current signal is searched for by phase difference adjustment and may also use a method where an amplitude "A×S(t)" is identified using a pair of reference signals having phases of 0° and 90°.

Also, a feedback loop may be formed such that the direct-current signal after the low-pass filtering by the filter 144 is returned to the phase difference adjuster 142, and the phase difference is adjusted by the phase difference adjuster 142 to maximize the output of the direct-current signal.

In formulas (1) through (3) above, the detection signal of the PSD 3 is expressed by a sine function with the period T1. However, the detection signal may also be expressed by a rectangular pulse function with the period T1.

When the light source drive circuit 105 performs pulse modulation on the VCSEL 1, the light source drive circuit 105 may use, for example, a method where a time profile of an electric current input to the VCSEL 1 is optimally controlled or a method where an external phase modulator is used to periodically change the resonator length of the VCSEL 1.

Narrowing (or shortening the pulses) of the laser beam emitted from the VCSEL 1 makes it possible to reduce the average light intensity of the laser beam used to irradiate the eye 30 and thereby makes it possible to improve the safety of the eye 30. The same effect can be achieved by using a pulsed laser as the light source in place of the VCSEL 1.

In the above example, some of the functions of the processor module 100 are implemented by software and the CPU 101. However, to increase the processing speed, those functions of the processor module 100 are preferably implemented by hardware such as analog electronic circuits. Also in the above example, some of the functions of the processor module 100 are implemented by hardware such as the light source drive circuit 105. However, those functions of the processor module 100 may instead be implemented by software and the CPU 101.

Referring back to FIG. 4, the calculator 150 includes a function to calculate a position of the pupil of the eye 30 based on the extracted signal received from the extracted signal output unit 146. For this purpose, the calculator 150 includes an eye rotation angle estimator 151 and a pupil position acquirer 152.

The eye rotation angle estimator 151 estimates the rotation angle of the eye 30 based on the extracted signal received from the extracted signal output unit 146 and outputs data on the estimated rotation angle to the pupil position acquirer 152. The pupil position acquirer 152 calculates the position of the pupil 31 based on the estimated rotation angle of the eye 30.

<Operations of Processor Module of First Embodiment>

Next, operations of the processor module 100 according to the first embodiment are described.

As preparation processes for a pupil position detection process, the pupil position detecting device 10 determines the incident angle of the laser beam emitted by the VCSEL 1 to irradiate the eye 30 and determines a formula for calculating the rotation angle of the eye 30. First, these preparation processes are described.

A linear function formula or a quadratic function formula is used to calculate the rotation angle of the eye 30. However, any other calculation formula may also be used as long as the calculation formula can determine the rotation angle based on the incident angle of the laser beam and the position of the beam spot on the light receiving surface of the PSD 3. In the present embodiment, a quadratic function formula is used as a simple approximation formula.

A surface shape model of the eye 30 may be used to determine the incident angle of the laser beam on the eye 30. For example, Schematic Eye (see "Optical Mechanism of Eye", Precision Machine 27-11, 1961), which is known as a standard surface shape model of an eye, may be used for this purpose.

Also, the incident angle of the laser beam on the eye 30 may be determined beforehand by, for example, ray trace calculations such that the incident position of the signal light on the PSD 3 becomes the center of the light receiving surface.

The incident position of the signal light on the light receiving surface of the PSD 3 can be theoretically analyzed based on the incident angle of the laser beam on the eye 30, the reflection position of the laser beam on the eye 30, and the inclination of a tangential surface on the eye 30. Then, based on the solution of the theoretical analysis, an inverse calculation formula (approximation formula) for estimating the rotation angle of the eye 30 by polynomial approximation can be determined.

The incident angle of the laser beam on the eye 30 and the inverse calculation formula for estimating the rotation angle of the eye 30 are stored in a memory such as the ROM 102 or the SSD 104 of the processor module 100 and can be referred to when the light emission driver 110 changes light emitters or when the calculator 150 performs a pupil position acquisition process.

FIG. 5 is a flowchart illustrating a process performed by the processor module 100 according to the first embodiment.

First, at step S51, the light emission driver 110 drives the VCSEL 1 to emit light at the light emission period T1.

Next, at step S53, the reference signal output unit 120 outputs a reference signal with the period TR1 that is the same as the light emission period T1, and the reference signal receiver 141 of the signal extractor 140 receives the reference signal.

At step S55, the detection signal receiver 130 receives a detection signal from the PSD 3.

At step S57, the phase difference adjuster 142 receives the detection signal from the detection signal receiver 130 and receives the reference signal from the reference signal receiver 141. Then, the phase difference adjuster 142 adjusts a phase difference between the phase φR of the reference signal and the phase φ1 of the detection signal and outputs the phase-adjusted reference signal and the phase-adjusted detection signal to the multiplier 143.

At step S59, the multiplier 143 multiplies the detection signal and the reference signal together and outputs the result of the multiplication as a multiplied signal to the filter 144.

At step S61, the filter 144 performs low-pass filtering on the multiplied signal and outputs an extracted signal corresponding to at least one of an extracted direct-current component and an extracted low-frequency component to the signal amplifier 145.

At step S63, the signal amplifier 145 amplifies the extracted signal to such a level that the extracted signal can be used for calculation of the pupil position and outputs the amplified extracted signal to the extracted signal output unit 146.

At step S65, the extracted signal output unit 146 outputs the amplified extracted signal to the calculator 150.

At step S67, the eye rotation angle estimator 151 inserts the amplified extracted signal in an inverse calculation formula for estimating the rotation angle to calculate an eye rotation angle and outputs eye rotation angle data to the pupil position acquirer 152.

At step S69, the pupil position acquirer 152 obtains pupil position data using the eye rotation angle data and a surface shape model of the eye 30, and outputs the pupil position data to the pupil position output unit 160.

Then, at step S71, the pupil position output unit 160 outputs the pupil position data.

Through the above process, the processor module 100 can output data indicating the position of the pupil 31 of the eye 30 which is obtained based on the detection signal output from the PSD 3.

<Operations of Pupil Position Detecting Device of First Embodiment>

Next, operations of the pupil position detecting device 10 of the first embodiment are described.

(Effect of Signal Extraction Process)

First, the results of an experiment performed to verify the effect of the signal extraction process are described. The experiment is intended to determine whether the signal extraction process performed by the signal extractor 140 makes it possible to accurately detect the position of a laser beam emitted by the VCSEL 1 even when the intensity of the laser beam is reduced.

In the experiments, a laser beam was mechanically modulated with a modulation frequency of 200 Hz (a period of 5 ms) using an optical chopper, an analog detection signal indicating the laser beam detected by the PSD 3 was converted into a digital voltage signal, and the digital voltage signal was input to a personal computer (PC). The signal extraction process by the signal extractor 140 was performed as software processing by the PC. Then, a beam spot position detected by the PSD 3 in a case where the signal extraction process was performed was compared with a beam spot position detected by the PSD 3 in a case where the signal extraction process was not performed. The cut-off frequency in the low-pass filtering was set at 40 Hz.

Figure 6A:
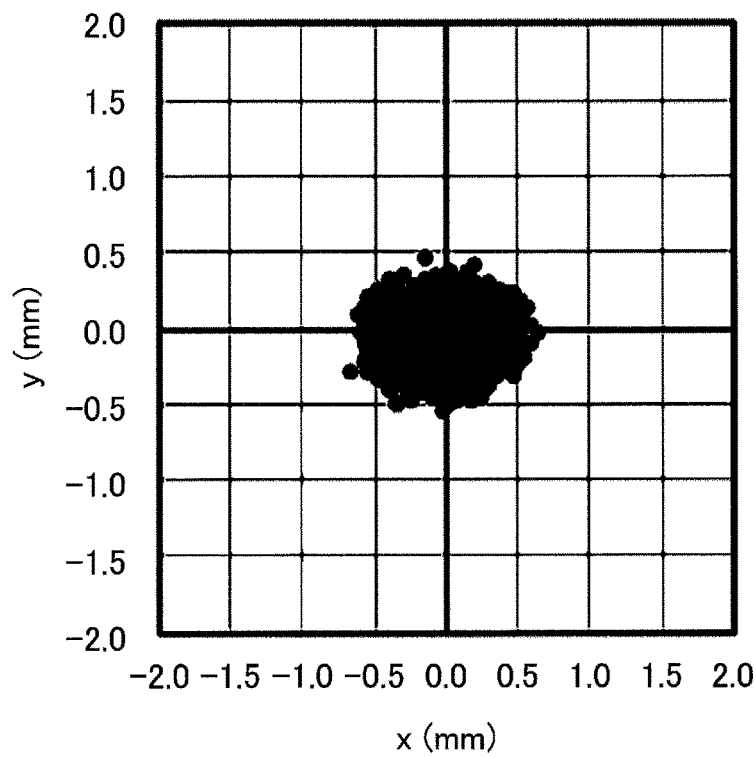
FIGS. 6A and 6B are graphs illustrating the results of an experiment performed to verify the effect of a signal extraction process.
Figure 6B:
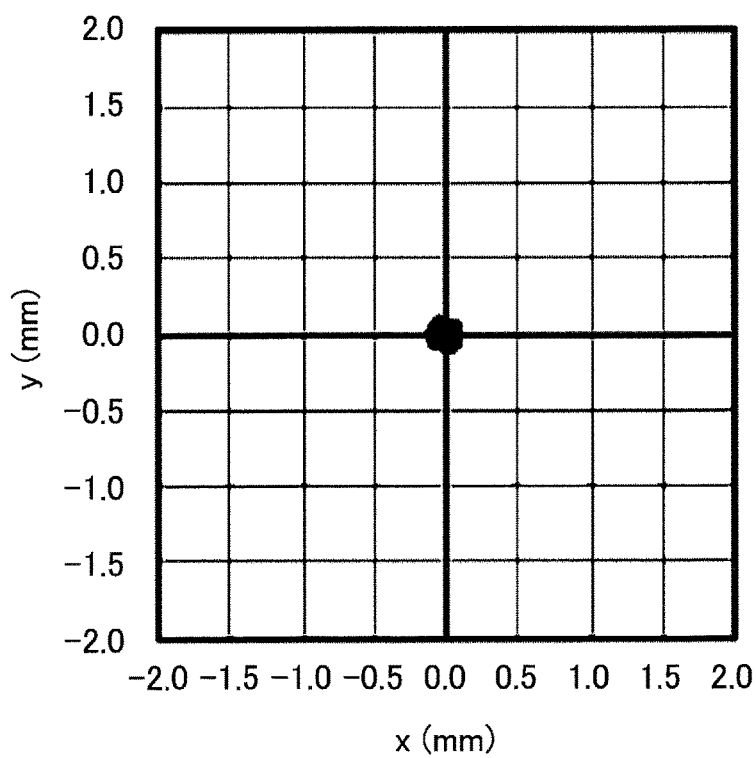

FIGS. 6A and 6B are graphs illustrating the results of an experiment performed to verify the effect of a signal extraction process. FIG. 6A is a graph illustrating results in a case where the signal extraction process was not performed, and FIG. 1B is a graph illustrating results in a case where the signal extraction process was performed.

In FIG. 6A, position detection results are dispersed. This indicates that light spots of noise light other than signal light are also formed on the light receiving surface of the PSD 3. On the other hand, in FIG. 6B, position detection results are concentrated on a center point. This indicates that the beam spot position of signal light is stably detected. The results of the experiment indicate that the signal extraction process performed by the signal extractor 140 makes it possible to accurately detect the position of a beam spot of signal light with the PSD 3 even when the intensity of the laser beam emitted by the VCSEL 1 is reduced.

The quantity of signal light reaching the light receiving surface of the PSD 3, which was measured by a power meter, was 2.6 µW. This indicates that signal light can be detected at high sensitivity even under interior illumination of about 60 µW.

Figure 7:
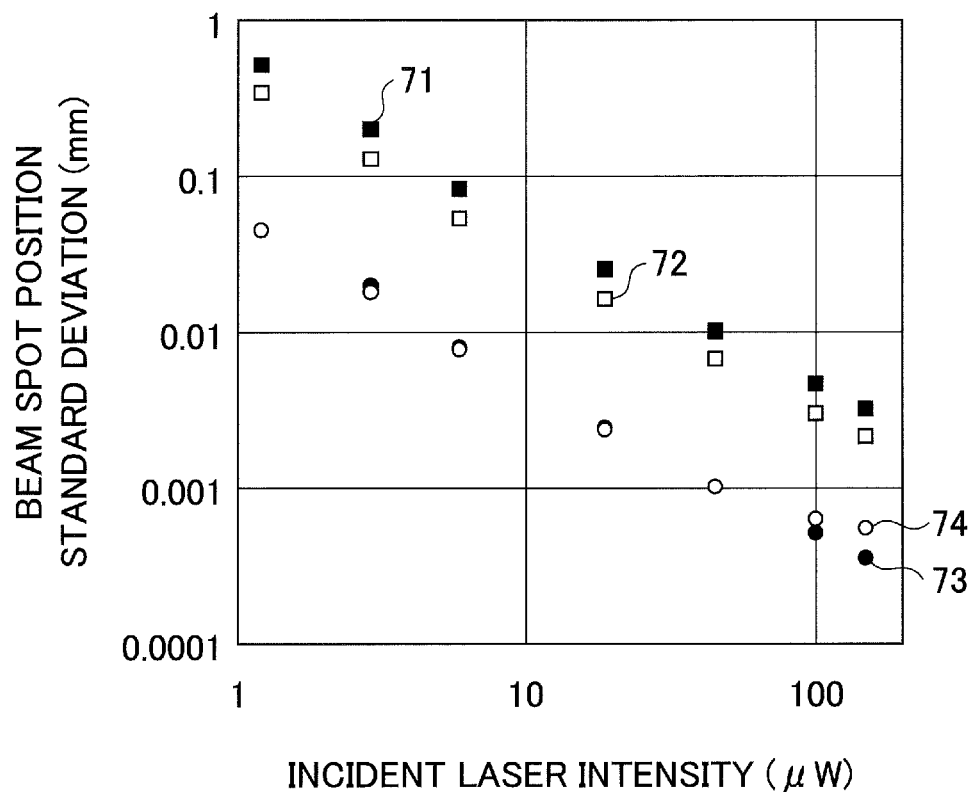
FIG. 7 is a graph illustrating the results of experiments performed by varying the intensity of a laser beam to verify the effect of a signal extraction process.

FIG. 7 is a graph illustrating the results of experiments performed by varying the intensity of a laser beam to verify the effect of the signal extraction process. In FIG. 7, the horizontal axis indicates the intensity of a laser beam, and the vertical axis indicates the standard deviation of a beam spot position detected by the PSD 3.

Also in FIG. 7, a solid square dot 71 indicates an X-direction position detected when the signal extraction process was not performed, and an outline square dot 72 indicates a Y-direction position detected when the signal extraction process was not performed.

A solid round dot 73 indicates an X-direction position detected when the signal extraction process was performed, and an outline round dot 74 indicates a Y-direction position detected when the signal extraction process was performed.

As illustrated in FIG. 7, the signal extraction process improved the detection accuracy by about one digit. The results also indicate that the signal extraction process can eliminate the anisotropy of the detection accuracy in the X direction and the Y direction.

(Effect of Pupil Position Acquisition Process)

Next, the results of a simulation performed to verify the effect of the pupil position acquisition process are described.

In this numerical simulation, it is assumed that the planar mirror 2 and the PSD 3 are arranged in a plane that is 10 mm away from the eye 30 in the −Z axis direction in FIG. 1. A reference angle (θx, θy) of the eye 30 is defined as a rotation angle of the eye 30 that is changed by 5 points in the X direction and 3 points in the Y direction in units of 5 degrees.

Figure 8A:
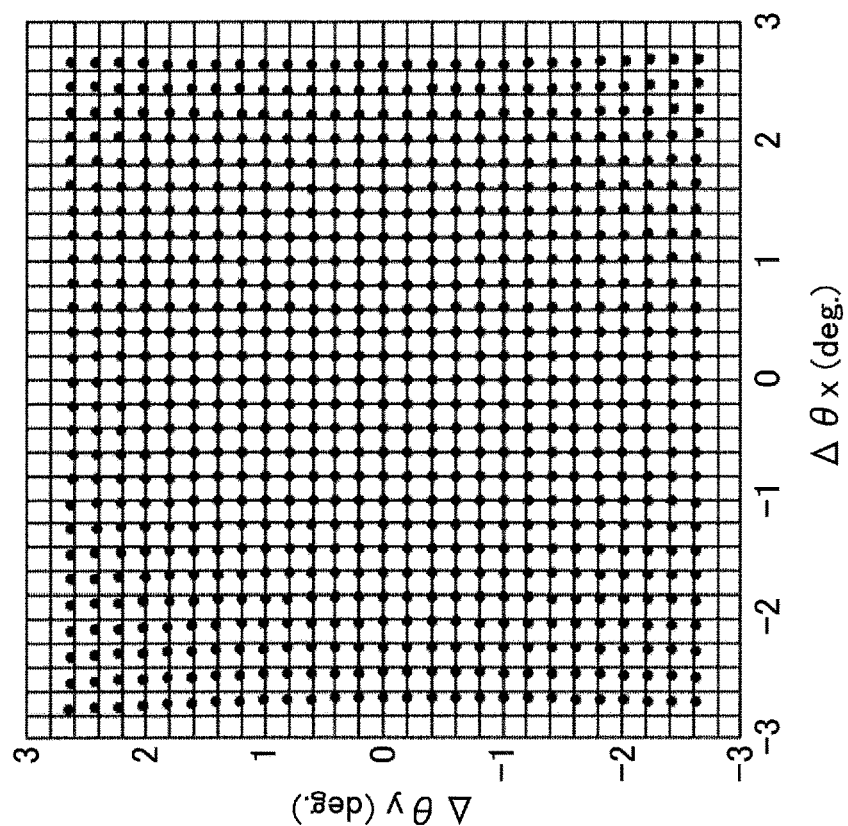
FIGS. 8A and 8B are drawings illustrating the results of simulations of a pupil position acquisition process.
Figure 8B:
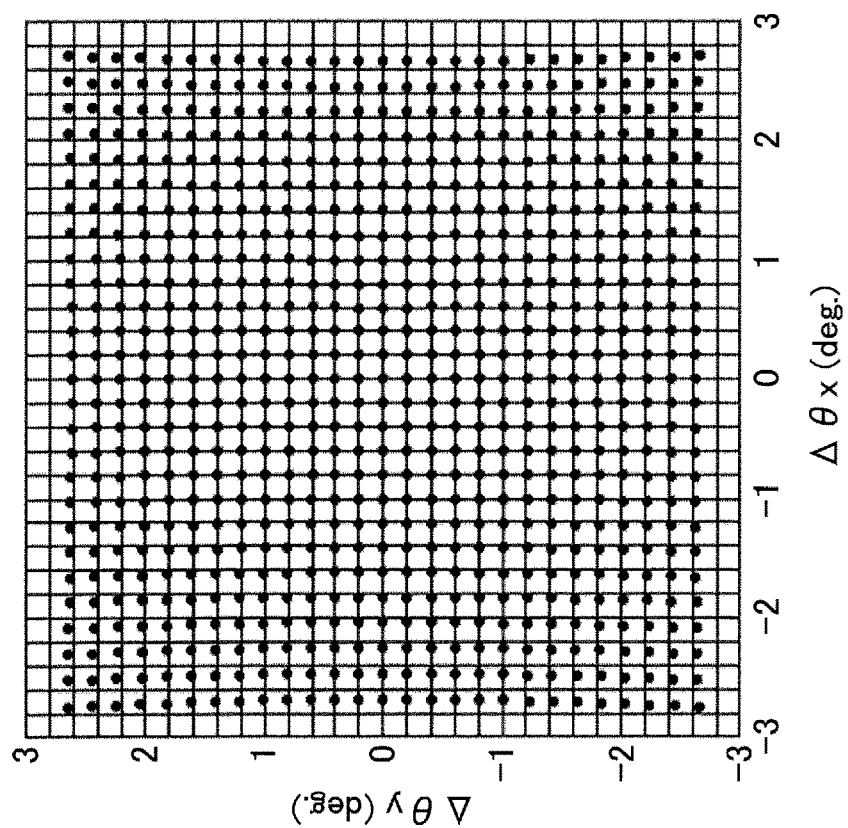

FIGS. 8A and 8B are drawings illustrating the results of simulations of the pupil position acquisition process. FIG. 8A is a drawing illustrating an estimation result of the rotation angle of the eye when the angle of the eye in a straight-looking state is used as the reference angle, and FIG. 8B is a drawing illustrating an estimation result of the rotation angle of the eye when the pupil position is shifted in the upper right direction from the straight-looking state.

In FIGS. 8A and 8B, the horizontal axis indicates the amount of change in the eye rotation angle in the X direction, and the vertical axis indicates the amount of change in the eye rotation angle in the Y direction. The values in FIGS. 8A and 8B are expressed relative to reference values (angle change amount (0, 0)) that correspond to incident angles obtained by changing the rotation angle by 5 points in the X direction and by 3 points in the Y direction in units of 5 degrees.

In the simulation, the angle of emergence at the position of the planar mirror 2 (or the reflection angle on the planar mirror 2) of the signal light reflected by the eye 30 and entering the center of the PSD 3 is obtained by a numerical calculation for each of the reference angles of the eye 30. Here, the center of the PSD 3 is expressed by coordinates (0, 0).

Also, differences ($\Delta\theta x$, $\Delta\theta y$) between angles of emergence of signal light and the reference angles ($\theta x$, $\theta y$) of the eye 30 are expressed by a quadratic function using an inverse calculation formula for estimating the differences ($\Delta\theta x$, $\Delta\theta y$) based on an incident position (x, y) on the light receiving surface of the PSD 3, and the coefficients of the quadratic function are numerically calculated by a Taylor expansion method.

In FIG. 8A, each lattice point indicates the actual rotation angle of the eye 30, and each dot indicates an estimated position. The dot accurately matches the lattice point when the rotation angle of the eye 30 is small. In this case, errors are kept within a range of $|\Delta\theta x| \leq 2.5$ degrees, and the maximum error is kept less than about 0.1 degrees. Here, a value of 2.5 degrees corresponds to one half of 5 degrees that is a unit of the reference angle, and indicates a condition for preventing occurrence of an area where no light is detected. Also, because it is assumed that the planar mirror 2 and the PSD 3 are arranged in a plane in the X direction, errors in the Y direction are smaller than errors in the X direction.

Also in FIG. 8B, errors in the estimated rotation angle of the eye 30 are within an error range similar to that in FIG. 8A.

The simulation results indicate estimated values of the rotation angle of the eye 30. The rotation angle of the eye 30 may be defined as an angle formed between the z axis corresponding to the straight-looking direction and a straight line connecting the center of the eye 30, i.e., the center of rotation, and the center of the cornea. Thus, the position of the pupil 31 can be calculated as coordinates that are apart from the center of the eye 30 in the direction of rotation of the eye 30 by a distance between the center of the eye 30 and the center of the cornea. The distance between the center of the eye 30 and the center of the cornea is set in the eye model beforehand.

Thus, the position of the pupil 31 can be calculated with sufficient accuracy by a process performed by the pupil position acquirer 152.

<Effects of Pupil Position Detecting Device of First Embodiment>

As described above, in the present embodiment, light for irradiating an object, such as the pupil 31 of the eye 30, is modulated with a predetermined light emission period, and a signal with a period corresponding to the light emission period is extracted from a detection signal output from the PSD 3 by using a reference signal with a period corresponding to the light emission period.

This configuration makes it possible to separate reflected light reflected by an object from noise light such as sunlight and extract a signal corresponding to the reflected light. This in turn makes it possible to accurately detect the position of the reflected light on the light receiving surface of the PSD 3 even when the intensity of the reflected light from the object is small.

Also, the present embodiment makes it possible to accurately detect the position of low-intensity light reflected from an object even when the object is an organism such as the pupil 31 of the eye 30 and the use of high-intensity light to irradiate the object is not preferable. Thus, the present embodiment makes it possible to accurately and safely detect the position of the pupil 31 of the eye 30.

Further, the present embodiment makes it possible to change light emitters of the VCSEL 1 at predetermined timing to change the incidence angle of light on the eye 30 and thereby makes it possible to increase the detection range of the position of the pupil 31. This in turn makes it possible to detect the position of an object such as the pupil 31 of the eye 30 with a non-mechanical configuration including no movable mechanism such as a MEMS mirror, and thereby makes it possible to detect the pupil position without being influenced by vibration and external impact.

The first embodiment is described above using the pupil position detecting device 10 as an example. However, the present invention is not limited to this example, and the first embodiment makes it possible to accurately detect the positions and the inclinations of various types of objects using low-intensity light.

Also in the first embodiment, the light emission period T1 and the period TR of the reference signal are set to match each other. However, the light emission period T1 and the period TR may not necessarily match each other as long as they correspond to each other in some way. For example, the period TR may be a multiple or a divisor of the light emission period T1. Also, noise light can also be reduced by using the light emission period T1 and the period TR that are close to each other. Therefore, the period TR may be determined relative to the light emission period T1 such that a signal-to-noise (SN) ratio necessary for an intended purpose can be obtained.

Second Embodiment

Next, a pupil position detecting device 10a according to a second embodiment is described. Below, descriptions of components of the pupil position detecting device 10a of the second embodiment that are substantially the same as those of the pupil position detecting device 10 of the first embodiment may omitted.

As described above with reference to FIG. 2, if the eye 30 rotates and signal light fails to enter the light receiving surface of the PSD 3, the pupil position cannot be detected.

For the above reason, in the second embodiment, multiple laser beams with different light emission periods are emitted at the same time (concurrently) toward the eye 30 from multiple light emitters of the VCSEL 1, and beam spots formed by the multiple laser beams (signal light) are received by the PSD 3 simultaneously or within a processing time of the PSD 3. Here, the processing time of the PSD 3 indicates a time period in which the PSD 3 performs a process using electric circuits after receiving the beam spots, and outputs detection signals indicating the positions of the beam spots.

This configuration makes it possible to reduce the chance that no signal light is detected by the PSD 3. This configuration is described in more detail below based on an assumption that laser beams are emitted simultaneously from two light emitters of the VCSEL 1 toward the eye 30.

<Functional Configuration of Processor Module of Second Embodiment>

Figure 9:
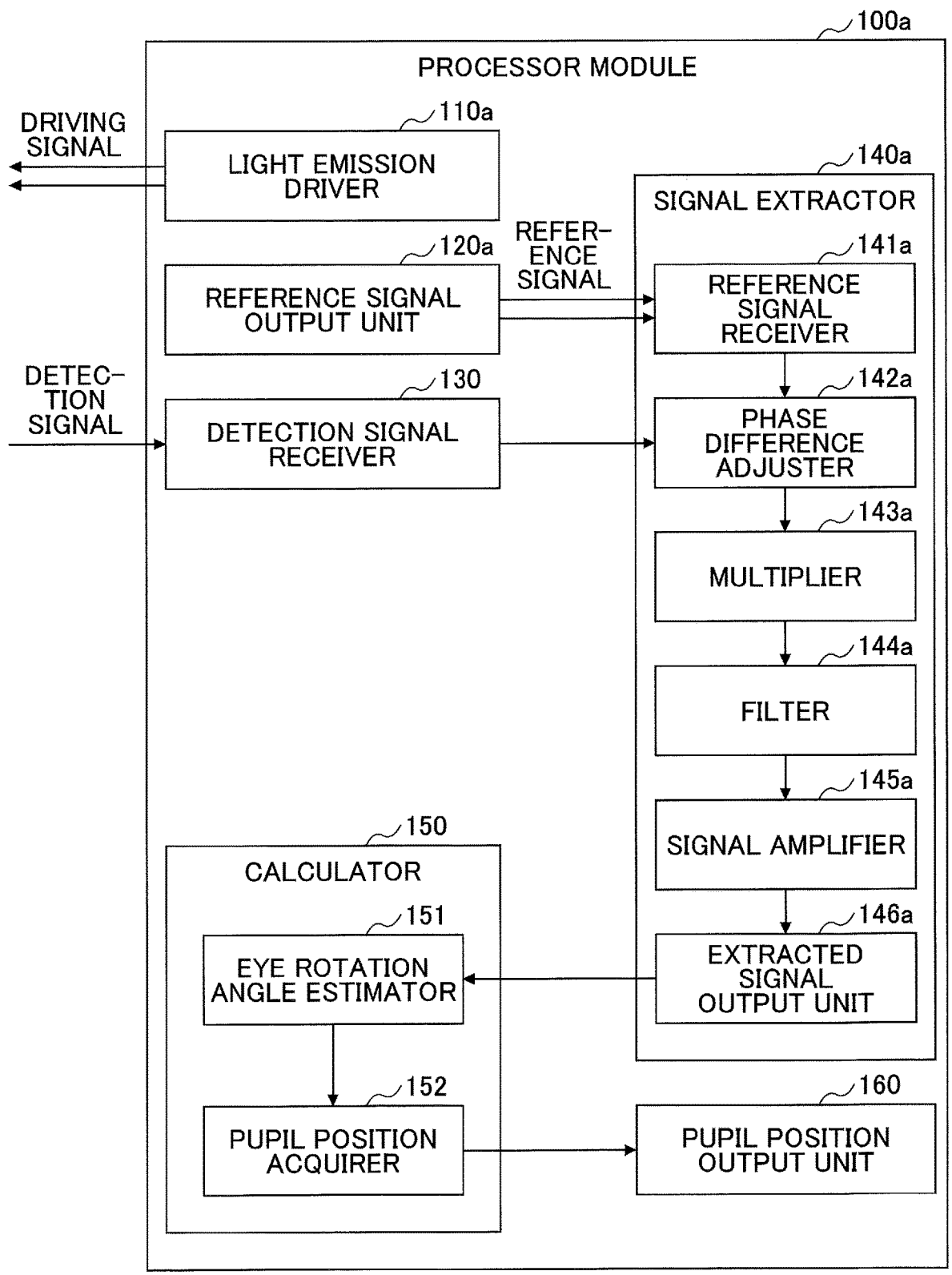
FIG. 9 is a block diagram illustrating a functional configuration of a processor module according to a second embodiment.

FIG. 9 is a block diagram illustrating a functional configuration of a processor module 100a of the pupil position detecting device 10a according to the second embodiment.

The processor module 100a includes a light emission driver 110a, a reference signal output unit 120a, and a signal extractor 140a.

The light emission driver 110a includes a function to output driving signals with different periods T1 and T2 to two light emitters of the VCSEL 1, and thereby simultaneously drive the two light emitters to emit light beams at light emission periods T1 and T2. The light emission driver 110a may be implemented by, for example, the light source drive circuit 105.

The reference signal output unit 120a may be implemented by, for example, the signal generation circuit 106. The reference signal output unit 120a includes a function to simultaneously output reference signals with periods TR1 and TR2 to the reference signal receiver 141a of the signal extractor 140a.

Here, the laser beams with the light emission periods T1 and T2 emitted toward the eye 30 are simultaneously reflected by multiple portions of the eye 30 and enter the light receiving surface of the PSD 3 simultaneously. The PSD 3 detects the light beams simultaneously or within the processing time of the PSD 3 and outputs one detection signal. The detection signal is input to the phase difference adjuster 142a via the detection signal receiver 130.

The signal extractor 140a includes a function to simultaneously extract signals with periods T1 and T2 corresponding to the light emission periods T1 and T2 from the detection signal output from the PSD 3 by using the reference signals with the periods TR1 and TR2 corresponding to the light emission periods T1 and T2 of the light emitters of the VCSEL 1. To achieve this function, the signal extractor 140a includes the reference signal receiver 141a, a phase difference adjuster 142a, a multiplier 143a, a filter 144a, a signal amplifier 145a, and an extracted signal output unit 146a. Here, it is assumed that each of the functional units simultaneously processes the reference signals with the periods TR1 and TR2.

The reference signal receiver 141a receives the reference signals with the periods TR1 and TR2 from the reference signal output unit 120a and outputs the reference signals to the phase difference adjuster 142a.

The phase difference adjuster 142a includes a function to adjust the phase difference between a phase φ1 of the detection signal and a phase φR1 of one of the reference signals and the phase difference between a phase 92 of the detection signal and a phase φR2 of another one of the reference signals, and to output the phase-adjusted detection signal and the phase-adjusted reference signals to the multiplier 143a.

This adjustment makes it possible to maximize the output of each direct-current signal.

The multiplier 143a multiplies the detection signal by the reference signal with the period TR1 and multiplies the detection signal by the reference signal with the period TR2.

As a result of making the period T1 substantially match the period TR1 by the phase difference adjuster 142a, a difference frequency component between a signal light component of the detection signal and the reference signal becomes a direct-current signal. This makes it possible to separate a signal light component S1(t) with the period T1 and a noise light component Nb(t) from each other in the frequency domain. Similarly, making the period T2 substantially match the period TR2 by the phase difference adjuster 142a makes it possible to separate a signal light component S2(t) with the period T2 and the noise light component Nb(t) from each other in the frequency domain.

The multiplier 143a outputs, to the filter 144a, a multiplied signal SR1 obtained by multiplying the detection signal by the reference signal with the period TR1 and a multiplied signal SR2 obtained by multiplying the detection signal by the reference signal with the period TR2.

The filter 144a includes a function to perform low-pass filtering on each of the multiplied signals SR1 and SR2 and output, to the signal amplifier 145a, extracted signals each of which corresponds to at least one of an extracted direct-current component and a low-frequency component. The signal amplifier 145a amplifies the extracted signals to such a level that the extracted signals can be processed for calculation of the pupil position and outputs the amplified extracted signals to the extracted signal output unit 146a. The extracted signal output unit 146a outputs the amplified extracted signals to the calculator 150.

<Operations of Processor Module of Second Embodiment>

Next, operations of the processor module 100a according to the second embodiment are described.

Figure 10:
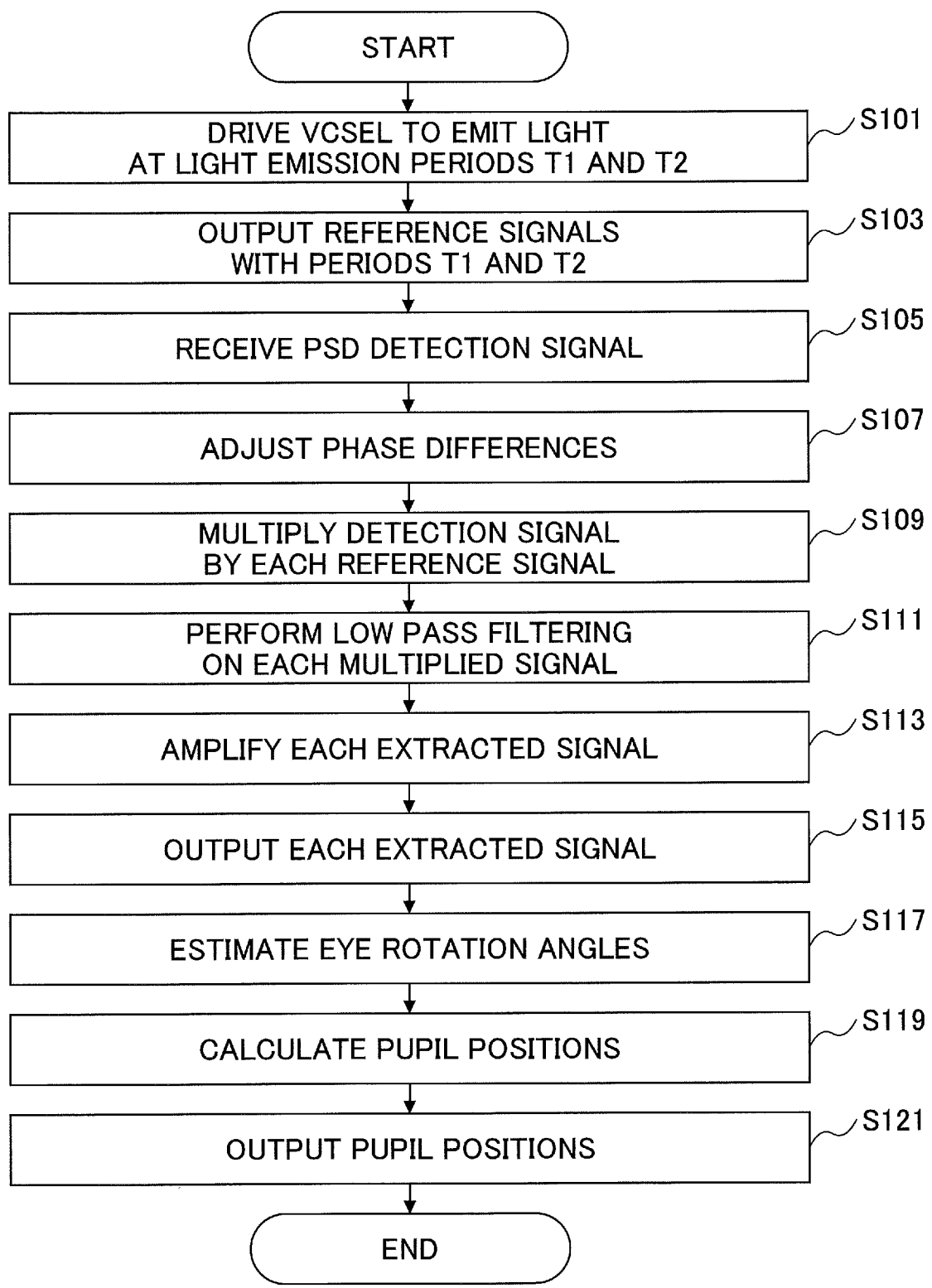
FIG. 10 is a flowchart illustrating a process performed by the processor module according to the second embodiment.

FIG. 10 is a flowchart illustrating a process performed by the processor module 100a according to the second embodiment.

First, at step S101, the light emission driver 110a drives the VCSEL 1 to emit light at the light emission periods T1 and T2.

Next, at step S103, the reference signal output unit 120a simultaneously outputs a reference signal with the period TR1 that is the same as the light emission period T1 and a reference signal with the period TR2 that is the same as the light emission period T2. The reference signal receiver 141a of the signal extractor 140a receives the reference signals.

At step S105, the detection signal receiver 130 receives a detection signal from the PSD 3.

At step S107, the phase difference adjuster 142a receives the detection signal from the detection signal receiver 130 and receives the reference signals with the periods TR1 and TR2 from the reference signal receiver 141a. The phase difference adjuster 142a adjusts the phase difference between a phase φ1 of the detection signal and a phase φR1 of one of the reference signals and the phase difference between a phase φ2 of the detection signal and a phase φR2 of another one of the reference signals, and outputs the phase-adjusted detection signal and the phase-adjusted reference signals to the multiplier 143a.

At step S109, the multiplier 143a multiplies the detection signal by the reference signal with the period TR1 and multiplies the detection signal by the reference signal with the period TR2. The multiplier 143a outputs, to the filter 144a, a multiplied signal SR1 obtained by multiplying the detection signal by the reference signal with the period TR1 and a multiplied signal SR2 obtained by multiplying the detection signal by the reference signal with the period TR2.

At step S111, the filter 144a performs low-pass filtering on each of the multiplied signals SR1 and SR2 and outputs, to the signal amplifier 145a, extracted signals each of which corresponds to at least one of an extracted direct-current component and a low-frequency component.

At step S113, the signal amplifier 145a amplifies the extracted signals to such a level that the extracted signals can be processed for calculation of the pupil position and outputs the amplified extracted signals to the extracted signal output unit 146a.

At step S115, the extracted signal output unit 146a outputs the amplified extracted signals to the calculator 150.

At step S117, the eye rotation angle estimator 151 inserts each of the amplified extracted signals in an inverse calculation formula for estimating the rotation angle to calculate an eye rotation angle based on each of the amplified extracted signals, and outputs the calculated eye rotation angles to the pupil position acquirer 152.

At step S119, the pupil position acquirer 152 obtains two sets of pupil position data using the eye rotation angles and a surface shape model of the eye 30, and outputs the two sets of pupil position data to the pupil position output unit 160.

Then, at step S121, the pupil position output unit 160 outputs the two sets of pupil position data.

Through the above process, the processor module 100a can output multiple sets of position data of the pupil 31 of the eye 30 which are obtained based on the detection signal output from the PSD 3.

<Effects of Pupil Position Detecting Device of Second Embodiment>

Next, effects of the pupil position detecting device 10a of the second embodiment are described.

Figure 11:
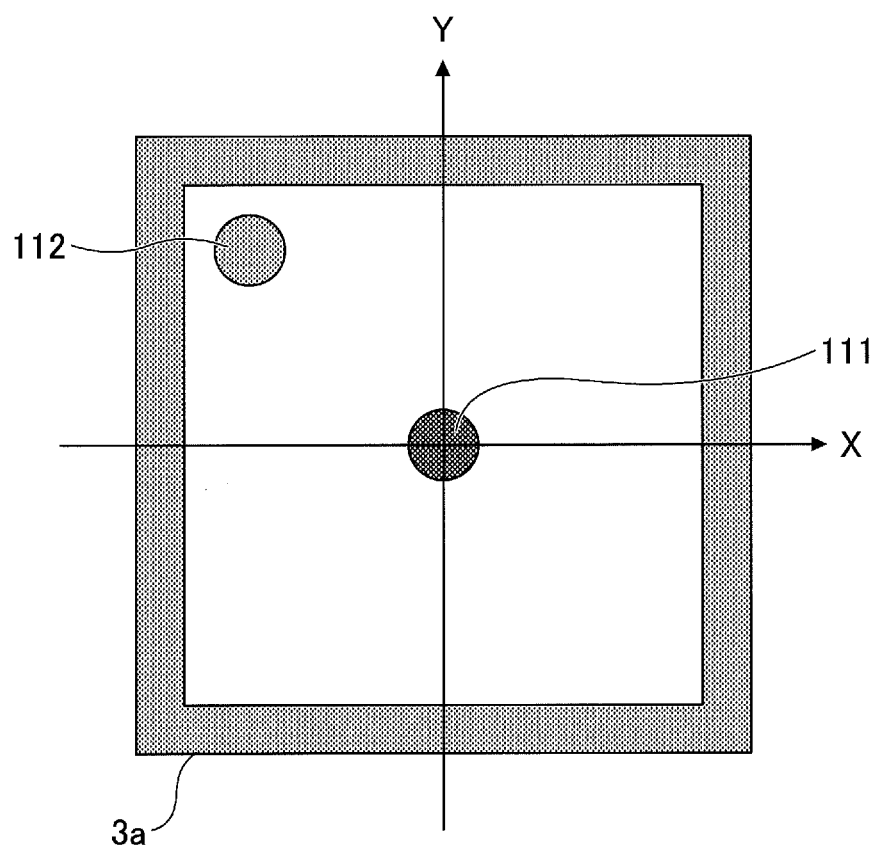
FIG. 11 is a drawing illustrating beam spots of signal light formed on a light receiving surface of a PSD according to the second embodiment.

FIG. 11 is a drawing illustrating beam spots of signal light formed on the light receiving surface of the PSD 3 according to the second embodiment.

As illustrated in FIG. 11, a beam spot 111 of signal light with the period T1 and a beam spot 112 of signal light with the period T2 are formed on a light receiving surface 3a of the PSD 3. The beam spots 111 and 112 are formed on the light receiving surface 3a simultaneously or within the processing time of the PSD 3.

Generally, a PSD is configured to detect the position of one beam spot formed on the light receiving surface and cannot detect the positions of two beam spots formed on the light receiving surface 3a as illustrated in FIG. 11.

In the second embodiment, signals corresponding to light emission periods are separated and extracted from a detection signal output from the PSD 3 by using reference signals with periods corresponding to the light emission periods. Then, the positions of two beam spots formed on the light receiving surface 3a are detected based on the extracted signals.

Compared with a case where one beam spot is used, using two beam spots makes it possible to increase the probability that a beam spot is formed on the light receiving surface 3a and reduce the chance that no signal light is detected by the PSD 3.

In the second embodiment, it is assumed that two beam spots are formed on the light receiving surface 3a. However, the number of beam spots may be further increased. As the number of beam spots increases, the probability that a beam spot is formed on the light receiving surface 3a further increases, and the chance that no signal light is detected by the PSD 3 is further reduced.

For example, if the pupil position detecting device 10a is configured such that five beam spots are formed at the center and four corners of the light receiving surface 3a, at least one of the beam spots can be detected even if the eye 30 rotates and the beam spots move in any one of ±X and ±Y directions in FIG. 11. This configuration makes it possible to further increase the probability that a beam spot is formed on the light receiving surface 3a and is therefore preferable.

In the second embodiment, it is assumed that components of the signal extractor 140a such as the multiplier 143a perform processes for the reference signals with different periods simultaneously (or in parallel). However, the present invention is not limited to this example. For example, processes may be performed sequentially (or serially) for the different periods by switching the periods of the reference signals. For example, a signal extraction process using the reference signal with the period TR1 may be performed first, and then a signal extraction process using the reference signal with the period TR2 may be performed.

When the signal extractor 140a is implemented by hardware electronic circuits to achieve high-speed processing, concurrently processing reference signals with different periods makes it possible to further increase the processing speed. On the other hand, this configuration requires multiple electronic circuits that perform the same process and correspond to the number of periods, and therefore increases the number of electronic circuits. This in turn increases the costs and the size of the pupil position detecting device 10a.

Sequentially performing signal extraction processes makes it possible to use the same electronic circuit for the processes, and thereby makes it possible to prevent an increase in the number of electronic circuits. This in turn makes it possible to reduce the costs and the size of the pupil position detecting device 10a.

Other effects of the pupil position detecting device 10a of the second embodiment are the substantially the same as those described in the first embodiment.

Third Embodiment

Next, an eye surface shape measurement device according to a third embodiment is described.

In the third embodiment, three or more laser beams with different light emission periods are emitted simultaneously toward the eye 30 from three or more light emitters of the VCSEL 1, and beam spots formed by the laser beams (signal light) are received by the PSD 3 simultaneously or within a processing time of the PSD 3. Then, based on a detection signal obtained by detecting the beam spots by the PSD 3, the surface shape of the eye 30 is measured. This configuration is described in more detail below based on an assumption that laser beams are emitted simultaneously from three light emitters of the VCSEL 1 toward the eye 30.

<Functional Configuration of Processor Module of Third Embodiment>

Figure 12:
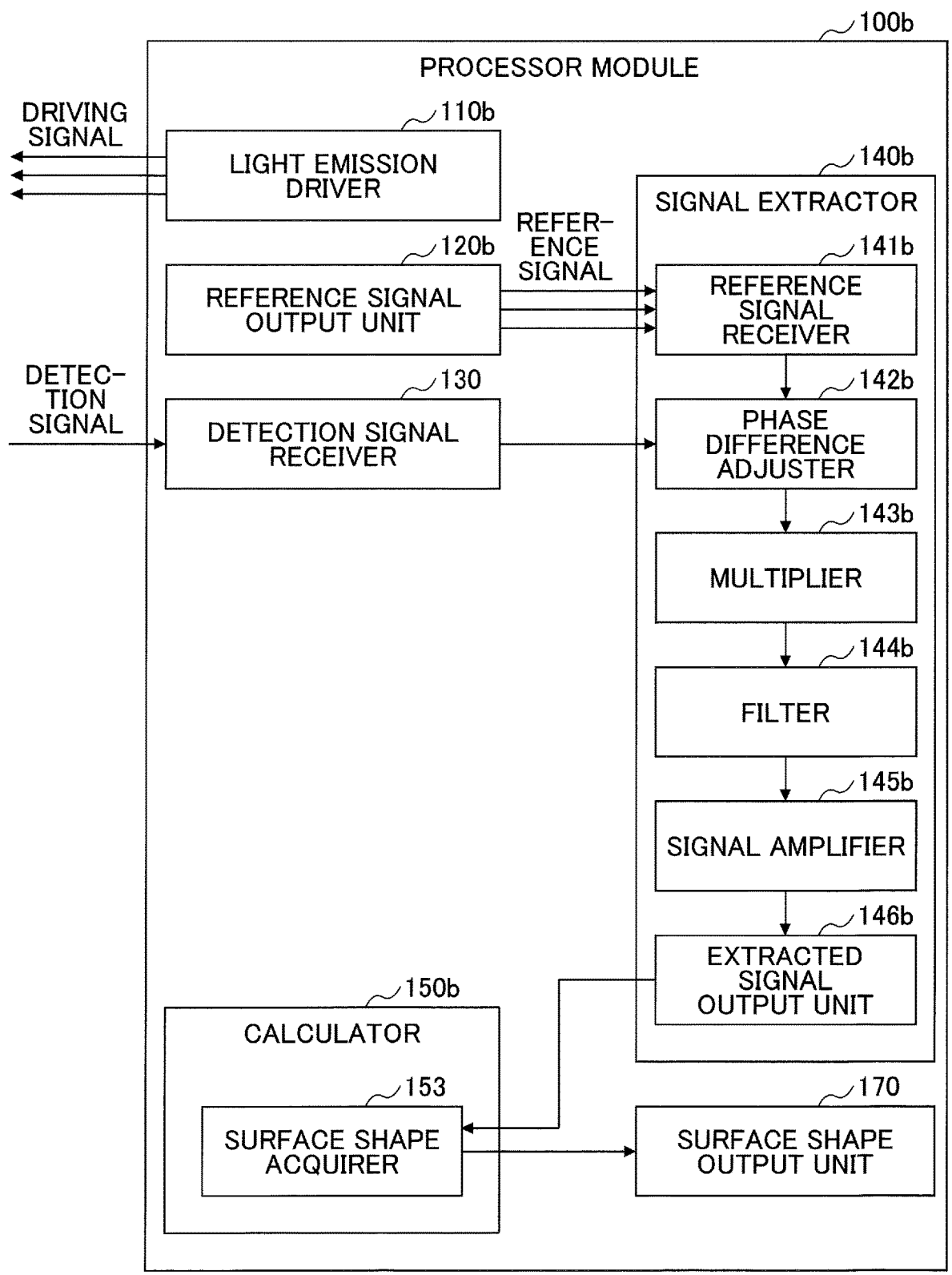
FIG. 12 is a block diagram illustrating a functional configuration of a processor module according to a third embodiment.

FIG. 12 is a block diagram illustrating a functional configuration of a processor module 100b of the eye surface shape measurement device according to the third embodiment.

As illustrated in FIG. 12, the processor module 100b includes a light emission driver 110b, a reference signal output unit 120b, a detection signal receiver 130, a signal extractor 140b, a calculator 150b, and a surface shape output unit 170. Here, the surface shape output unit 170 is an example of an "output unit".

The functions of the light emission driver 110b, the reference signal output unit 120b, and the signal extractor 140b are substantially the same as those of the light emission driver 110a, the reference signal output unit 120a, and the signal extractor 140a (see FIG. 9) except that the number of signals with different periods is changed from two to three. Therefore, descriptions of these components are omitted here.

Referring to FIG. 12, the calculator 150b includes a function to calculate the radius of curvature of the eye 30 based on extracted signals received from the signal extractor 140b. For this purpose, the calculator 150b includes a surface shape acquirer 153.

The surface shape acquirer 153 receives three extracted signals from the extracted signal output unit 146b. The radius of curvature of the eye 30 can be obtained by fitting data indicated by the three extracted signals to a sphere. The surface shape acquirer 153 obtains surface shape data of the eye 30 based on the radius of curvature and outputs the surface shape data to the surface shape output unit 170.

The surface shape output unit 170 outputs the surface shape data received from the surface shape acquirer 153.

<Operations of Processor Module of Third Embodiment>

Figure 13:
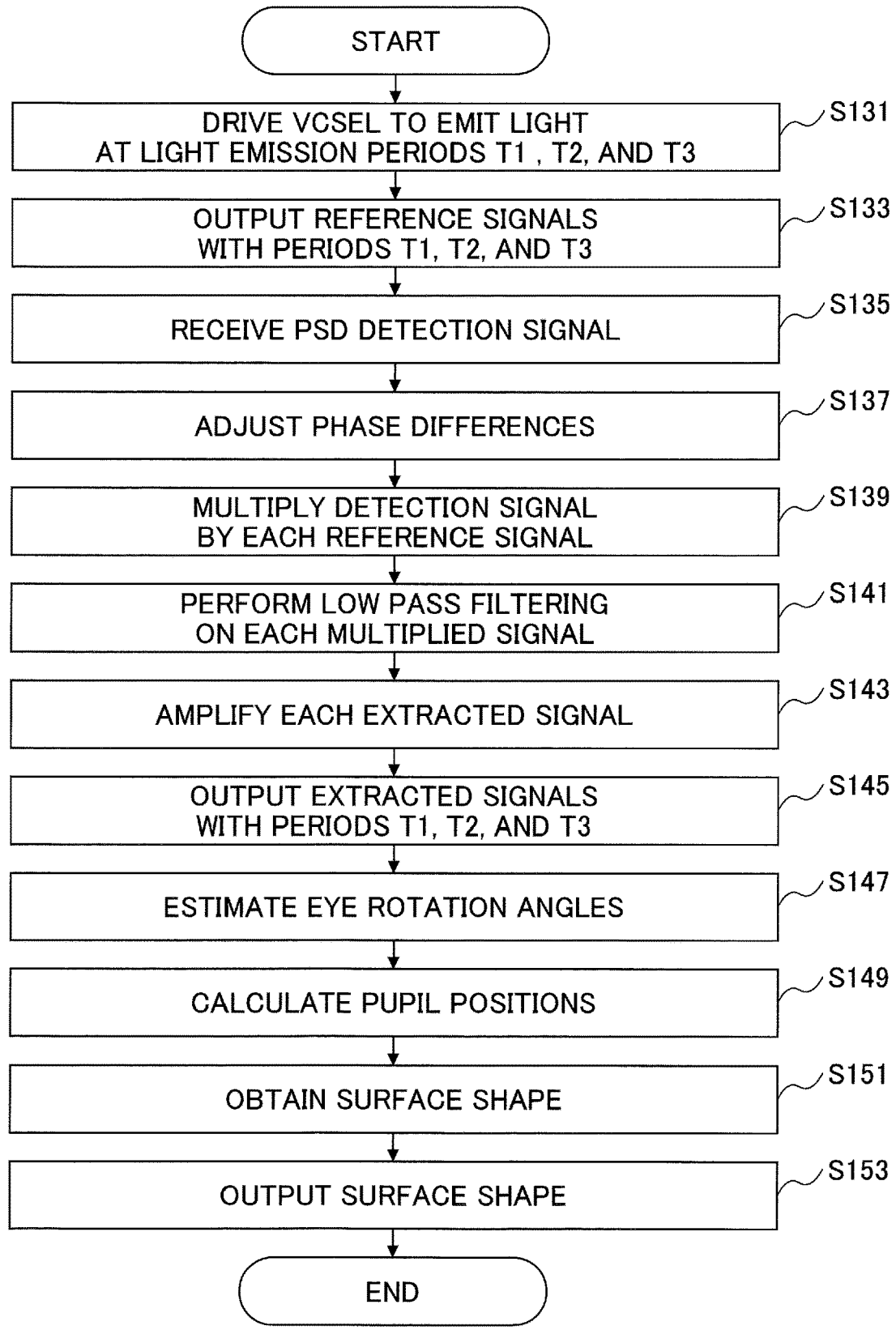
FIG. 13 is a flowchart illustrating a process performed by the processor module according to the third embodiment.

FIG. 13 is a flowchart illustrating an example of a process performed by the processor module 100b of the eye surface shape measurement device according to the third embodiment.

Steps S131 through S149 are substantially the same as steps S101 through S119 in FIG. 10 except that the number of signals with different periods is changed from two to three. Therefore, descriptions of these steps are omitted here.

At step S151 in FIG. 13, the surface shape acquirer 153 receives three extracted signals and fits the extracted signals to a sphere to obtain the radius of curvature of the sphere. Then, the surface shape acquirer 153 obtains surface shape data of the eye 30 based on the radius of curvature and outputs the surface shape data to the surface shape output unit 170.

Next, at step S153, the surface shape output unit 170 outputs the surface shape data received from the surface shape acquirer 153.

Through the above process, the processor module 100b can obtain surface shape data of the eye 30 based on the detection signal output from the PSD 3, and output the surface shape data. The eye surface shape measurement device may also be configured to output radius of curvature data.

<Effects of Processor Module of Third Embodiment>

Figure 14:
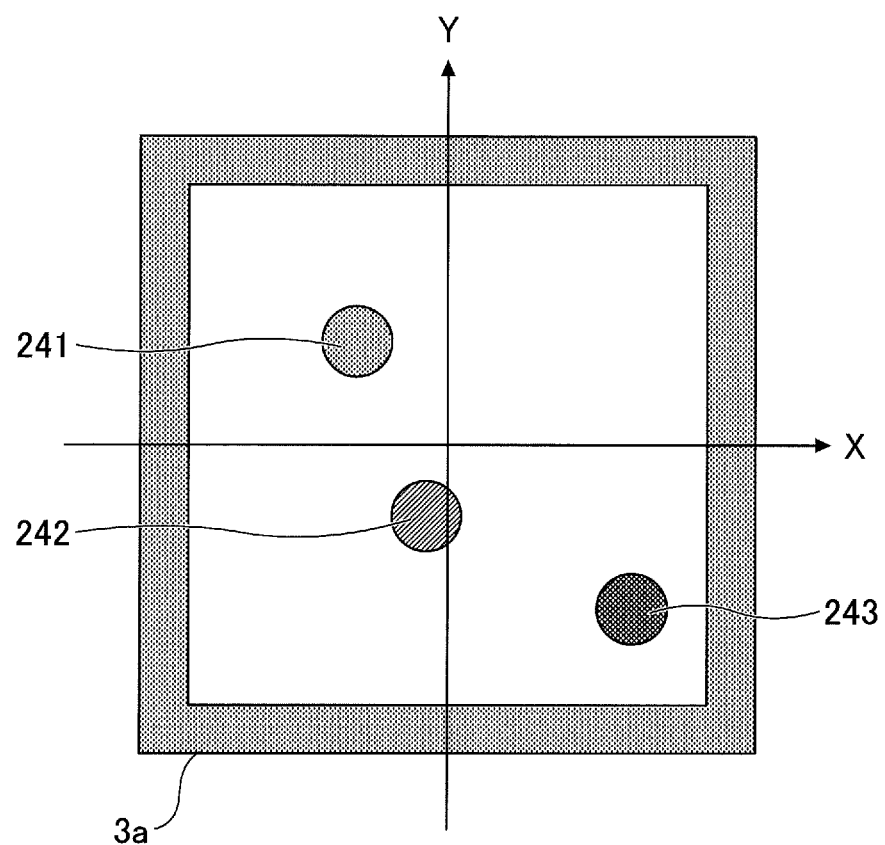
FIG. 14 is a drawing illustrating beam spots of signal light formed on a light receiving surface of a PSD according to the third embodiment.

FIG. 14 is a drawing illustrating beam spots of signal light formed on the light receiving surface of the PSD 3 according to the third embodiment.

As illustrated in FIG. 14, a beam spot 241 of signal light with a period T1, a beam spot 242 of signal light with a period T2, and a beam spot 243 of signal light with a period T3 are formed on the light receiving surface 3a of the PSD 3. The beam spots 241 through 243 are formed on the light receiving surface 3a simultaneously or within a processing time of the PSD 3.

In the third embodiment, similarly to the second embodiment, signals corresponding to light emission periods are separated and extracted from a detection signal output from the PSD 3 by using reference signals with periods corresponding to the light emission periods. Based on three extracted signals, the surface shape acquirer 153 obtains the radius of curvature and the surface shape of the eye 30.

Here, as described above, the surface shape model of the eye 30 is used to determine the incident angles of laser beams on the eye 30 and an inverse calculation formula (approximation formula) for estimating the rotation angle of the eye 30. However, because the surface shape of the eye varies depending on personal differences, age, and gender, an error may occur in a detected pupil position of the eye 30 if a fixed surface shape model of the eye 30 is used.

According to the third embodiment, the surface shape acquirer 153 can construct a surface shape model of the eye 30 based on the obtained surface shape. Accordingly, the third embodiment makes it possible to use a surface shape model of the eye 30 that is constructed based on actual measurements. This in turn makes it possible to correct differences in the surface shape model due to personal differences, age, and gender, and appropriately determine the incident angles of laser beams on the eye 30 and an inverse calculation formula (approximation formula) for estimating the rotation angle of the eye 30. This configuration enables the pupil position detecting device 10 to accurately detect the pupil position.

The surface shape of the eye 30 can be more accurately measured as the number of laser beams for irradiating the eye 30 increases. Therefore, the number of laser beams is preferably as large as possible.

Fourth Embodiment

Next, a retinal projection display according to a fourth embodiment is described with reference to FIG. 15.

Figure 15:
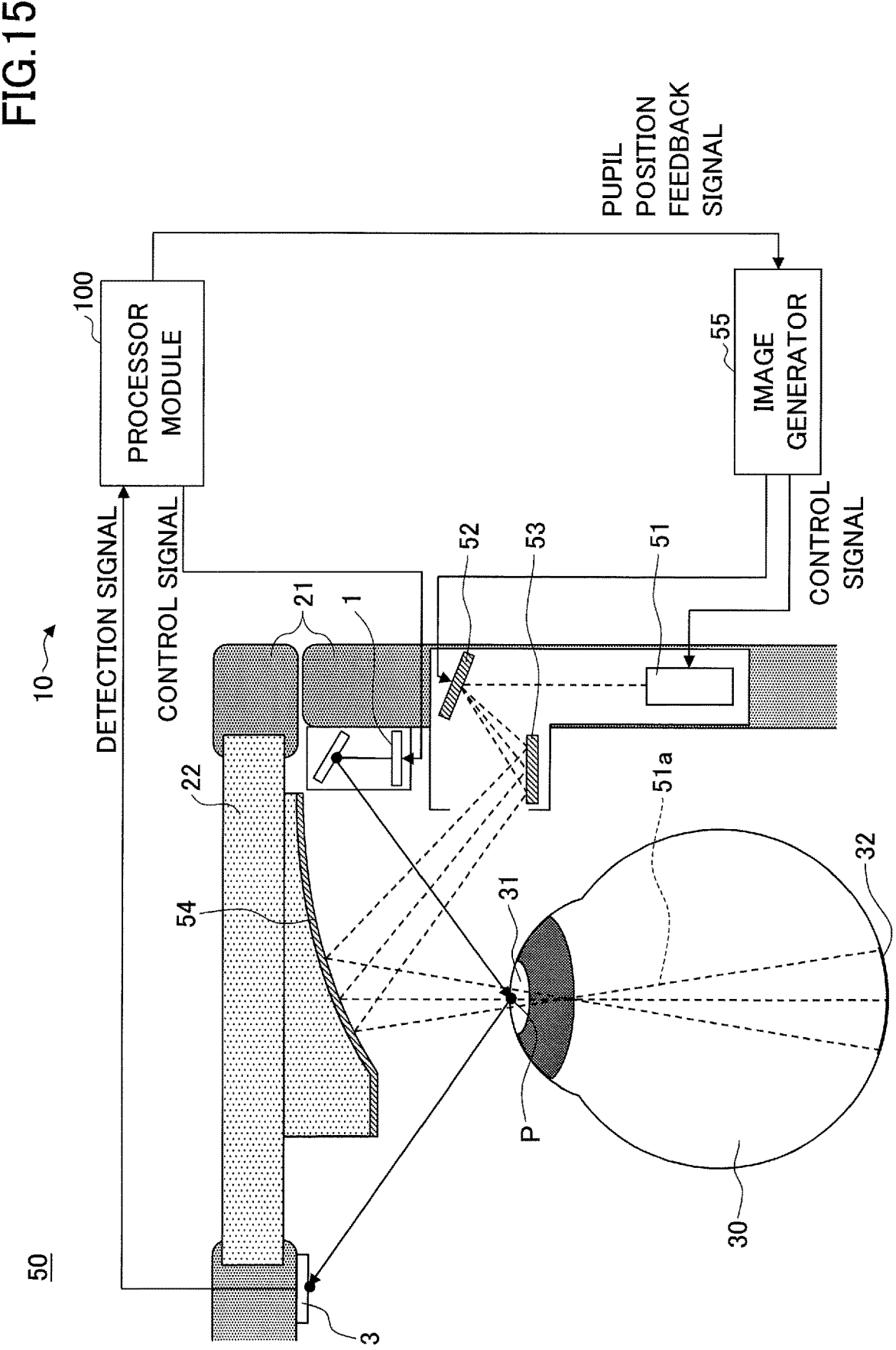
FIG. 15 is a drawing illustrating a configuration of a retinal projection display according to a fourth embodiment.

FIG. 15 is a drawing illustrating an example of a configuration of a retinal projection display 50 according to the fourth embodiment.

The retinal projection display 50 includes an RGB (Red, Green, Blue) laser 51, a scan mirror 52, a planar mirror 53, a half mirror 54, an image generator 55, and the pupil position detecting device 10.

The RGB laser 51 temporally modulates and outputs R, G, and B laser beams. The scan mirror 52 two-dimensionally scans light from the RGB laser 51. The scan mirror 52 is, for example, a MEMS mirror. However, the scan mirror 52 is not limited to a MEMS mirror, but may be any type of mirror such as a polygon mirror or a galvanometer mirror that includes a reflection part for scanning light. The MEMS mirror is preferable in terms of size and weight. The MEMS mirror may employ any one of an electrostatic drive system, a piezoelectric drive system, and an electromagnetic drive system.

The planar mirror 53 reflects the scanned light from the scan mirror 52 toward the half mirror 54. The half mirror 54 transmits a part of incident light and reflects another part of the incident light toward the eye 30. The half mirror 54 has a concave curved shape and causes the reflected light to converge near the pupil 31 of the eye 30 and form an image on the retina 32. With this configuration, an image formed by the scanned light is projected onto the retina 32. Light 51a indicated by dotted lines in FIG. 15 forms an image on the retina 32. The ratio of reflected light to transmitted light in the half mirror 54 is not necessarily 1:1.

The pupil position detecting device 10 detects the position of the pupil 31 according to the ocular movement and sends a feedback signal indicating the position of the pupil 31 to the image generator 55.

The image generator 55 includes an angle control function for controlling the angle of the scan mirror 52 and a light emission control function for controlling the RGB laser 51. The image generator 55 receives a feedback signal indicating the position of the pupil 31 from the pupil position detecting device 10. Based on the position of the pupil 31 detected by the pupil position detecting device 10, the image generator 55 controls the angle of the scan mirror 52 and the light emission of the RGB laser 51 to change the projection angle of an image or the content of the image. This configuration makes it possible to form, on the retina 32, an image that tracks (eye tracking) changes in the position of the pupil 31 resulting from ocular movements.

In the above example, the retinal projection display 50 is a head mounted display (HMD) that is an example of a wearable terminal. The retinal projection display 50 may be implemented as a head mounted display that is directly mounted on a human head as well as a head mounted display that is indirectly mounted on the human head via a component such as a fixing part. Also, a binocular retinal projection display including a pair of retinal projection displays 50 for the right and left eyes may be provided.

<<Comparison with Related-Art Eye-Tracking Device>>

Figure 16:
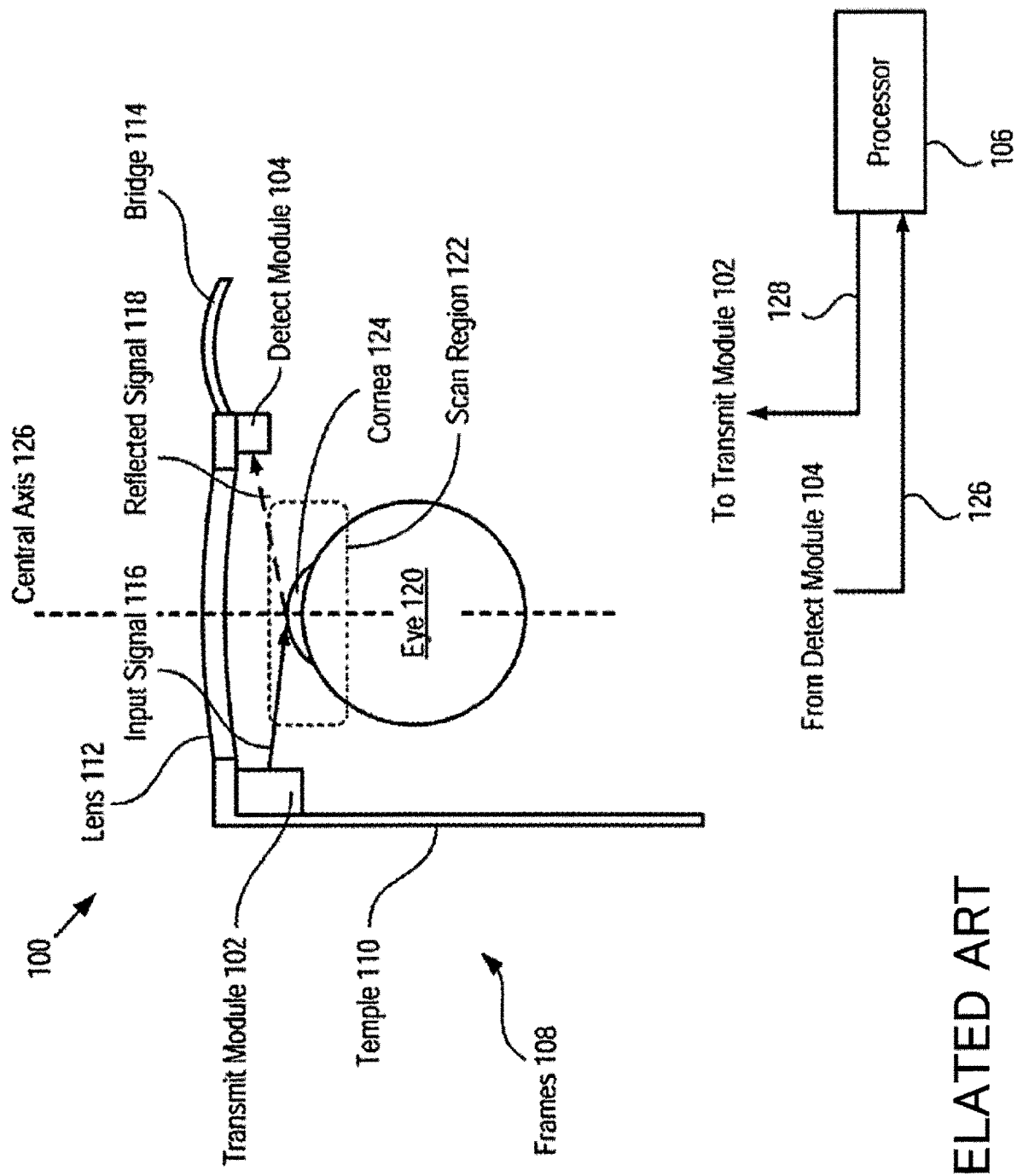
FIG. 16 is a drawing illustrating a configuration of a related-art eye-tracking device.

The pupil position detecting device 10 of the embodiment is compared with a related-art eye-tracking device described in US 2016/0166146. FIG. 16 is a drawing illustrating a configuration of the eye-tracking device described in US 2016/0166146.

In the eye-tracking device, a laser is used as a light source, and a laser beam emitted from the laser is scanned by a MEMS mirror to change the incident angle of the laser beam on the eye. On the other hand, in the pupil position detecting device 10, a VCSEL including multiple light emitters is used as a light source, and the incident angle of light on the eye is changed by changing light emitters of the VCSEL to be driven. Also in the pupil position detecting device 10, an optical deflection unit (a lens, a planar mirror, a microlens array, a concave curved mirror, a holographic diffraction element, a prism array, a diffraction grating, etc.) is used together with the VCSEL to increase the range within which the incident angle can be changed. Thus, in the pupil position detecting device 10 of the embodiment, the incident angle of light on the eye is changed without using a movable component. Compared with a configuration including a movable component, the configuration of the present embodiment is more resistant to vibration and external impact.

In the related-art eye-tracking device, the intensity of light reflected by the cornea is detected by a photodetector. On the other hand, in the pupil position detecting device 10 of the embodiment, the position of light reflected by the eye and entering the light receiving surface of a PSD is detected. A PSD detects the position of incident light regardless of the light intensity. Therefore, even if the intensity of reflected light varies depending on the reflection position on the eye, the PSD can detect the position of incident light at high sensitivity without being influenced by the variation in the intensity of reflected light. Accordingly, using a PSD makes it possible to accurately detect, for example, an inclination of the pupil of the eye.

The pupil position detecting device 10 of the embodiment includes the light emission driver 110 that drives light emitters in different positions on the VCSEL to emit light at different timings. This configuration makes it possible to cause light reflected by the eye to enter the light receiving surface of the PSD taking into account coarse movements of the eye, and makes it possible to detect fine movements of the eye based on the incident light positions detected by the PSD.

In the related-art eye-tracking device, the position of the eye is estimated based on two peak intensities (two reflection points on the cornea) of light reflected by the eye on the time axis. In the pupil position detecting device 10 of the embodiment, the position of the eye is estimated based on one reflection position on, for example, the cornea the eye. Therefore, the VCSEL and the PSD are not necessarily arranged symmetrically. That is, the PSD may be disposed on the same side as the VCSEL instead of being disposed near the specular reflection (mirror reflection) angle of the eye.

An optical device, a retinal projection display, a head-mounted display, and an input device according to the embodiments of the present invention are described above. However, the present invention is not limited to the specifically disclosed embodiments, and variations and modifications may be made without departing from the scope of the present invention.

Information on the pupil position detected by the pupil position detecting device 10 may be used for eye tracking in an input device of an electronic device. For example, an output from the pupil position detecting device 10 illustrated in FIG. 1 may be input to the electronic device and used for eye tracking. This enables eye tracking that is robust for, for example, head displacement.

Also, the pupil position detecting device 10 may be used for an ophthalmoscopic device that includes a function to detect the inclination of an eye and the position of a pupil (cornea). An ophthalmoscopic device refers to a device that can perform a variety of tests such as a visual acuity test, a refractive power test, an intraocular pressure test, and an axial length test. The ophthalmoscopic device can examine an eye without contacting the eye and includes a support that supports the face of a subject, an ophthalmoscopic window, a display that displays an object for fixing the orientation (line of sight) of the eye of the subject during an ophthalmoscopic examination, a controller, and a measurement unit. To improve the accuracy of measurement by the measurement unit, the subject is requested to look at a single point without moving the eye (line of sight). For this purpose, the subject fixes his/her face on the support and fixates an object displayed on the display through the ophthalmoscopic window. An eye inclination detecting device of an embodiment may be used to detect the inclination of the eye during this process. The eye inclination detecting device may be disposed laterally to the measurement unit so as not to interfere with measurement. Eye inclination (line of sight) information obtained by the eye inclination detecting device is fed back to the controller so that proper measurement can be performed according to the eye inclination information.

What is claimed is:

1. An optical device, comprising:
   a plurality of mirrors including a half mirror having a concave curved shape;
   a light source that emits light to irradiate an object included in an eye, the plurality of mirrors arranged to reflect the light wherein the half mirror is arranged to transmit a part of the light and to reflect another part of the light toward the eye;
   a light emission driver that drives the light source to emit light at a predetermined light emission period;
   a position detector having a structure in which a resistive film is provided on a continuous light receiving surface not divided into pixels configured to receive reflected light that is the light reflected by the object, and multiple output terminals, the position detector being configured to obtain a position of the received reflected light on the light receiving surface based on distances between the received reflected light and the output terminals and output a detection signal indicating the position of the received reflected light;
   a signal extractor that
      extracts, from the detection signal, a signal with a period corresponding to the light emission period by using a reference signal with a period corresponding to the light emission period, and
      outputs the extracted signal; and
   an outputter that outputs data obtained based on the extracted signal and indicating at least one of a position, an inclination, a radius of curvature, and a surface shape of the object.

2. The optical device as claimed in claim 1, wherein
   the light source includes at least two light emitters; and
   the light emission driver drives the light emitters to concurrently emit light to irradiate the object.

3. The optical device as claimed in claim 2, wherein
   the light emission driver drives the light emitters to emit light at different light emission periods; and
   the signal extractor
      extracts, from the detection signal, signals with periods corresponding to the different light emission periods by using reference signals with periods corresponding to the different light emission periods, and
      outputs the extracted signals.

4. The optical device as claimed in claim 1, wherein
   the light source includes at least three light emitters;
   the light emission driver drives the light emitters to concurrently emit light at different light emission periods to irradiate the object; and the signal extractor
extracts, from the detection signal, signals with periods corresponding to the different light emission periods by using reference signals with periods corresponding to the different light emission periods, and outputs the extracted signals.

5. The optical device as claimed in claim 1, wherein the signal extractor includes
a phase difference adjuster that adjusts a phase difference between the detection signal and the reference signal;
a multiplier that multiplies the detection signal by the reference signal to obtain a multiplied signal; and
a filter that extracts at least one of a direct-current component and a low frequency component from the multiplied signal.

6. The optical device as claimed in claim 1, wherein the signal extractor extracts the extracted signal with the period that is same as the light emission period by using the reference signal with the period that is same as the light emission period.

7. The optical device as claimed in claim 1, further comprising:
a reference signal output unit that outputs the reference signal.

8. The optical device as claimed in claim 7, further comprising:
a signal generator that outputs an electric signal with a predetermined period to the light emission driver and the reference signal output unit.

9. The optical device as claimed in claim 1, wherein the light source includes a surface emitting laser.

10. The optical device as claimed in claim 1, wherein the light source includes a pulse laser.

11. The optical device as claimed in claim 1, wherein the position detector includes a two-dimensional position sensitive detector (PSD).

12. A retinal projection display, comprising:
the optical device as claimed in claim 1.

13. A head-mounted display, comprising:
the optical device as claimed in claim 1.

14. An input device, comprising:
the optical device as claimed in claim 1.

15. The optical device as claimed in claim 1, wherein the light source is a vertical cavity surface emitting laser.

16. The optical device as claimed in claim 1, wherein the continuous light receiving surface is a light receiving surface that is not divided into pixels.

17. The optical device as claimed in claim 1, wherein
the position detector further includes a resistive film provided on the continuous light receiving surface, an electric current generated by the received reflected light on the continuous light receiving surface being divided into multiple electric currents according to the distances between the received reflected light and the output terminals; and
the position detector is configured to
detect, via the corresponding output terminals, multiple electric signals of the multiple electric currents that pass through the resistive film, and
obtain the position of the received reflected light on the light receiving surface based on the detected electric signals.

18. An optical device, comprising:
a plurality of mirrors including a half mirror having a concave curved shape;
a light source that emits light to irradiate an object included in an eye, the plurality of mirrors arranged to reflect the light wherein the half mirror is arranged to transmit a part of the light and to reflect another part of the light toward the eye;
a light emission driver that drives the light source to emit light at a predetermined light emission period;
a position detector having a structure in which a resistive film is provided on a continuous light receiving surface not divided into pixels configured to receive reflected light that is the light reflected by the object, and multiple output terminals, the position detector being configured to obtain a position of the received reflected light on the light receiving surface based on distances between the received reflected light and the output terminals and output a detection signal indicating the position of the received reflected light;
a signal extractor that
extracts, from the detection signal, a signal with a period corresponding to the light emission period by using a reference signal with a period corresponding to the light emission period, and
outputs the extracted signal; and
an outputter that outputs data obtained based on the extracted signal and indicating at least one of an inclination, a radius of curvature, and a surface shape of the object.

19. The optical device as claimed in claim 1, wherein the data indicating the position is detected by converting the detection signal from the position detector into coordinate information,
wherein the data indicating the inclination is detected based on a change of the position,
wherein the data indicating the radius of curvature is obtained by fitting data indicated by the extracted signal to a sphere, and
wherein the data indicating the surface shape of the object is obtained based on the radius of curvature.

* * * * *